US010344156B2

(12) United States Patent
Nakajima et al.

(10) Patent No.: US 10,344,156 B2
(45) Date of Patent: Jul. 9, 2019

(54) AQUEOUS DISPERSION MIXTURE

(71) Applicants: SUMITOMO CHEMICAL COMPANY, LIMITED, Tokyo (JP); Covestro Deutschland AG, Leverkusen (DE)

(72) Inventors: Hideto Nakajima, Osaka (JP); Hiroshi Morita, Amagasaki (JP); Hiroyuki Higashimoto, Amagasaki (JP)

(73) Assignees: SUMITOMO CHEMICAL COMPANY, LIMITED, Chuo-ku, Tokyo (JP); COVESTRO DEUTSCHLAND AG, Leverkusen (DE)

( * ) Notice: Subject to any disclaimer, the term of this patent is extended or adjusted under 35 U.S.C. 154(b) by 109 days.

(21) Appl. No.: 15/573,508

(22) PCT Filed: May 13, 2016

(86) PCT No.: PCT/JP2016/064363
§ 371 (c)(1),
(2) Date: Nov. 13, 2017

(87) PCT Pub. No.: WO2016/186047
PCT Pub. Date: Nov. 24, 2016

(65) Prior Publication Data
US 2018/0118931 A1 May 3, 2018

(30) Foreign Application Priority Data
May 15, 2015 (JP) .................................. 2015-100447

(51) Int. Cl.
*C08L 23/26* (2006.01)
*C09D 123/26* (2006.01)
*C09J 123/26* (2006.01)
*C09J 5/02* (2006.01)
*C09D 5/00* (2006.01)
*C09D 5/02* (2006.01)
*C09D 123/00* (2006.01)
*C09D 175/04* (2006.01)
*C09J 123/00* (2006.01)
*C09J 175/04* (2006.01)
*C08L 23/00* (2006.01)
*C08L 75/04* (2006.01)

(52) U.S. Cl.
CPC .............. *C08L 23/26* (2013.01); *C08L 23/00* (2013.01); *C08L 75/04* (2013.01); *C09D 5/00* (2013.01); *C09D 5/002* (2013.01); *C09D 5/02* (2013.01); *C09D 123/00* (2013.01); *C09D 123/26* (2013.01); *C09D 175/04* (2013.01); *C09J 123/00* (2013.01); *C09J 123/26* (2013.01); *C09J 175/04* (2013.01); *C08L 2201/54* (2013.01)

(58) Field of Classification Search
CPC ...... C08L 23/26; C08L 67/04; C08L 2201/54; C09D 5/02; C09D 123/26; C09J 9/06; C09J 123/26
See application file for complete search history.

(56) References Cited

U.S. PATENT DOCUMENTS

| | | | |
|---|---|---|---|
| 2010/0021742 A1 | 1/2010 | Kataoka et al. | |
| 2011/0020741 A1* | 1/2011 | Mizumori | C08J 3/12 430/105 |
| 2013/0340816 A1 | 12/2013 | Kuriyama et al. | |
| 2014/0323651 A1* | 10/2014 | Maisonneuve | C08G 18/755 524/590 |
| 2017/0210947 A1* | 7/2017 | Yamada | H01B 1/22 |

FOREIGN PATENT DOCUMENTS

| | | |
|---|---|---|
| EP | 1970419 A1 | 9/2008 |
| JP | 3-182534 A | 8/1991 |
| JP | 6128551 A | 5/1994 |
| JP | 2001-247760 A | 9/2001 |
| JP | 2002-322306 A | 11/2002 |
| JP | 2004-51661 A | 2/2004 |
| JP | 2009-13226 A | 1/2009 |
| JP | 2009-235289 A | 10/2009 |
| JP | 5071750 B1 | 11/2012 |
| JP | 2013-100399 A | 5/2013 |
| JP | 5541553 B1 | 7/2014 |
| JP | 5620051 B2 | 11/2014 |
| JP | 2014-240174 A | 12/2014 |

OTHER PUBLICATIONS

Communication dated Oct. 8, 2018, from European Patent Office in counterpart application No. 16796440.2.
Database WPI, Week 199423, Thomson Scientific, London, GB; AN 1994-189185, XP-002784811, May 10, 1994, 2 pages total.
International Search Report dated Jul. 19, 2016 issued by the International Searching Authority in International Application No. PCT/JP2016/064363.

(Continued)

*Primary Examiner* — Robert D Harlan
(74) *Attorney, Agent, or Firm* — Sughrue Mion, PLLC

(57) ABSTRACT

The present invention provides an aqueous dispersion mixture comprising; an aqueous dispersion (A) that comprises a crystalline polyolefin (a) as a dispersoid thereof; an aqueous dispersion (B) that comprises a crystalline polyurethane (b) as a dispersoid thereof; and an aqueous dispersion (C) that comprises a non-crystalline polyurethane (c) as a dispersoid thereof, wherein the crystalline polyolefin (a) is a non-chlorine modified polyolefin, wherein the crystalline polyurethane (b) has a crystal melting heat amount equal to or larger than 3 J/g measured by differential scanning calorimetry, wherein the non-crystalline polyurethane (c) has a crystal melting heat amount smaller than 3 J/g measured by differential scanning calorimetry, and wherein the aqueous dispersion (B) comprises a non-volatile content of 30 parts by mass to 100 parts by mass and the aqueous dispersion (C) comprises a non-volatile content of 20 parts by mass to 80 parts by mass, relative to a non-volatile content of 100 parts by mass of the aqueous dispersion (A).

18 Claims, No Drawings

(56) References Cited

OTHER PUBLICATIONS

International Preliminary Report on Patentability with the translation of Written Opinion dated Nov. 21, 2017, issued by the International Bureau in International Application No. PCT/JP2016/064363.

* cited by examiner

AQUEOUS DISPERSION MIXTURE

TECHNICAL FIELD

This patent application is a National Stage of International Application No. PCT/JP2016/064363, filed on May 13, 2016, which claims priority from Japan Patent Application No. 2015-100447 (filed on May 15, 2015), the contents of all of which are incorporated herein by reference in their entirety.

BACKGROUND ART

Polyolefins such as a propylene homopolymer and a copolymer of propylene and an α-olefin are each excellent in mechanical physical properties, heat resistance, chemical resistance, water resistance, and the like, are each inexpensive, and therefore have traditionally been used in a wide range of fields such as those of automobile parts and home appliances.

It is known that, the surface of a base material comprising a polyolefin generally has low adhesiveness for materials other than polyolefins and tends to avoid formation of a coated film of an adhesive, a paint, or the like. An attempt has been made to improve painting property and adhesiveness by using modified polyolefins such as a chlorinated polyolefin, an acid-modified chlorinated polyolefin, and an acid-modified polyolefin each as a component of a primer or an adhesive. For the primer and the adhesive, the modified polyolefin is usually used in the form of a solution in an organic solvent or a dispersion in an aqueous solvent and is advantageously used in the form of an aqueous dispersion based on the safety and the environmental viewpoint.

On the other hand, for the primer, the adhesive, and the like each comprising the dispersion of the modified polyolefin, dispersions have been proposed that each use an acrylic resin, a urethane resin, or the like together with the modified polyolefin, to improve adhesiveness for a base material, a paint, and the like each made of a material other than a polyolefin while most of the dispersions concurrently use a curing agent to improve water resistance, solvent resistance, and chemical resistance (Patent Documents 1 to 3).

When the curing agent is concurrently used, problems however arise such as pot life and complication of production steps. A primer and an adhesive are therefore demanded that each are excellent in the coated film properties such as the water resistance, solvent resistance, and chemical resistance without using any curing agent. A primer and an adhesive are also demanded that each do not comprise any halogen substances such as chlorine from the viewpoint of the environmental problems, and polyolefins each modified by chlorine or a material comprising chlorine tend to be skirted.

Patent Document 1: Japanese Laid-Open Patent Publication No. 2013-100399

Patent Document 2: Japanese Patent Publication No. 5071750

Patent Document 3: Japanese Patent Publication No. 5541553

SUMMARY OF THE INVENTION

Problems to be Solved by the Invention

As above, with the aqueous dispersion mixture of the aqueous dispersion of the modified polyolefin and the aqueous dispersion of an acrylic resin, a urethane resin, or the like, the coated film properties such as the water resistance are degraded when any curing agent is not used. An aqueous dispersion mixture is therefore demanded that has excellent adhesiveness for a base material comprising a polyolefin, that has excellent adhesiveness for a base material or a paint comprising a material other than the polyolefins, and that achieves excellent coated film properties such as, especially, water resistance, humidity resistance, and recoating property, without using any curing agent.

An object of the present invention is to provide an aqueous dispersion mixture that has excellent adhesiveness for a base material comprising a polyolefin, that also has excellent adhesiveness for a base material or a paint comprising a material other than polyolefins, and that is excellent in the coated film properties such as, especially, water resistance, and humidity resistance. The aqueous dispersion mixture does not comprise any chlorine from the viewpoint of the environmental problems.

Means for Solving Problems

The present invention provides the following means.

[1]

An aqueous dispersion mixture comprising an aqueous dispersion (A) that comprises a crystalline polyolefin (a) as a dispersoid thereof, an aqueous dispersion (B) that comprising a crystalline polyurethane (b) as a dispersoid thereof, and an aqueous dispersion (C) that comprises a non-crystalline polyurethane (c) as a dispersoid thereof, wherein
the crystalline polyolefin (a) is a non-chlorine modified polyolefin, wherein
the crystalline polyurethane (b) has a crystal melting heat amount equal to or larger than 3 J/g measured by differential scanning calorimetry (hereinafter, also referred to as "DSC"), wherein
the non-crystalline polyurethane (c) has a crystal melting heat amount smaller than 3 J/g measured by DSC, and wherein
the aqueous dispersion (B) comprises a non-volatile content of 30 parts by mass to 100 parts by mass and the aqueous dispersion (C) comprises a non-volatile content of 20 parts by mass to 80 parts by mass, relative to a non-volatile content of 100 parts by mass of the aqueous dispersion (A).

[2]

The aqueous dispersion mixture according to [1], wherein the crystalline polyurethane (b) has a crystal melting heat amount equal to or larger than 5 J/g measured by differential scanning calorimetry.

[3]

The aqueous dispersion mixture according to [1], wherein the crystalline polyurethane (b) has the crystal melting heat amount equal to or larger than 10 J/g measured by differential scanning calorimetry.

[4]

The aqueous dispersion mixture according to [1], wherein the crystalline polyurethane (b) has the crystal melting heat amount equal to or larger than 30 J/g measured by differential scanning calorimetry.

[5]

The aqueous dispersion mixture according to any one of [1] to [4], wherein the non-chlorine modified crystalline polyolefin (a) comprises a modified functional group unit of 0.1 to 40 parts by mass relative to 100 parts by mass of an olefin unit.

[6]

The aqueous dispersion mixture according to any one of [1] to [5], wherein melting points of the non-chlorine modified crystalline polyolefin (a) and the crystalline polyurethane (b) measured by differential scanning calorimetry (DSC) are each equal to or lower than 100° C.

[7]

The aqueous dispersion mixture according to any one of [1] to [6], wherein a weight average molecular weight Mw of the non-chlorine modified crystalline polyolefin (a) is 20,000 to 200,000.

[8]

The aqueous dispersion mixture according to any one of [1] to [7], wherein the dispersoids of the aqueous dispersions (A), (B), and (C) each have an average particle diameter equal to or smaller than 1.0 μm.

[9]

The aqueous dispersion mixture according to any one of [1] to [8], wherein the dispersoid of the aqueous dispersion (A) is a self-emulsion of a non-chlorine modified crystalline polyolefin.

[10]

The aqueous dispersion mixture according to any one of [1] to [9], wherein glass transition points of the crystalline polyurethane (b) and the non-crystalline polyurethane (c) measured by the differential scanning calorimetry (DSC) are each equal to or lower than −20° C.

[11]

The aqueous dispersion mixture according to any one of [1] to [10], wherein the crystalline polyurethane (b) and the non-crystalline polyurethane (c) are each a polyurethane that comprises, as a constituting component of the polyurethane, one or more structural unit(s) selected from the group consisting of an aliphatic diisocyanate, an alicyclic diisocyanate, and an aromatic diisocyanate, and one or more structural unit(s) selected from the group consisting of a polyester polyol, a polycarbonate polyol, and a polytetramethyleneether glycol.

[12]

The aqueous dispersion mixture according to any one of [1] to [11], wherein the crystalline polyurethane (b) comprises a carboxyl group and/or a sulfonyl group.

[13]

A method for producing a coated film comprising a step of applying the aqueous dispersion mixture according to any one of [1] to [12] to a base material.

[14]

The method for producing a coated film, according to [13], wherein the base material comprises a resin or a resin composition.

[15]

A painted article comprising an applied and dried item of the aqueous dispersion mixture according to any one of [1] to [12].

[16]

An aqueous paint composition comprising the aqueous dispersion mixture according to any one of [1] to [12].

[17]

The aqueous paint composition according to [16], comprising, relative to 100 parts by mass of a non-volatile content of the aqueous dispersion (A), 30 to 100 parts by mass of a non-volatile content of the aqueous dispersion (B), 20 to 80 parts by mass of a non-volatile content of the aqueous dispersion (C), 1 to 200 parts by mass of a pigment (D), 0 to 50 parts by mass of a viscosity modifier (E), 0 to 1,000 parts by mass of a solvent (F), 0 to 50 parts by mass of an auxiliary resin (G), and 0 to 100 parts by mass of other additives (H).

[18]

The aqueous paint composition according to [16] or [17], wherein an amount of a volatile organic compound (VOC) is equal to or smaller than 250 g/L.

[19]

An aqueous primer composition comprising the aqueous dispersion mixture according to any one of [1] to [12].

[20]

The aqueous primer composition according to [19], wherein an amount of a volatile organic compound is equal to or smaller than 250 g/L.

[21]

An aqueous adhesive comprising the aqueous dispersion mixture according to any one of [1] to [12].

Effect of the Invention

The aqueous dispersion mixture of the present invention not only presents strong adhesiveness for a base material that comprises a polyolefin but also presents high adhesiveness for a base material that comprises a polymer other than polyolefins and for coated films that each comprise any one of various types of paint such as a clear coat and a base coat each comprising a material other than polyolefins. The aqueous dispersion mixture of the present invention achieves high humidity resistance and high water resistance. The aqueous dispersion mixture of the present invention is a mixture that takes into consideration the environment by using a polyolefin that is not modified by chlorine. The aqueous dispersion mixture of the present invention can advantageously be used for a primer, a paint composition, an aqueous adhesive, and the like.

MODES FOR CARRYING OUT THE INVENTION

An aqueous dispersion mixture of the present invention is a mixture comprising an aqueous dispersion (A) that comprises a non-chlorine modified crystalline polyolefin (hereinafter, referred to as "polyolefin (a)" as the dispersoid thereof, an aqueous dispersion (B) that comprises a crystalline polyurethane (hereinafter, referred to as "polyurethane (b)" as the dispersoid thereof, and an aqueous dispersion (C) that comprises a non-crystalline polyurethane (hereinafter, referred to as "polyurethane (c)" as the dispersoid thereof, In this specification, the polyolefin (a) refers to a crystalline polyolefin that is not modified by chlorine or any material comprising chlorine but that is modified by an unsaturated compound comprising a modified functional group and that comprises a structural unit originated from the unsaturated compound comprising the modified functional group (hereinafter, referred to as "modified functional group unit"). The crystalline polyolefin refers to a homopolymer or a copolymer that comprises a crystalline portion having molecules regularly arranged therein in at least a portion thereof and that comprises one or more type(s) of structural unit originated from an olefin (hereinafter, referred to as "olefin unit"), and refers to a polymer that has a crystal melting peak (the melting point) whose crystal melting heat amount is equal to or larger than 1 J/g in a temperature range of −100 to 200° C. The crystal melting heat amount and the melting point can be measured using, for example, the methods described later.

In this specification, the crystalline polyurethane (b) refers to a polyurethane whose crystal melting heat amount measured by DSC is equal to or larger than 3 J/g.

In this specification, the non-crystalline urethane (c) refers to a polyurethane whose crystal melting heat amount measured by DSC is smaller than 3 J/g.

Examples of the method of modifying the crystalline polyolefin using an unsaturated compound having a modified functional group include a method according to which a homopolymer and/or a copolymer each having an olefin unit are/is melted and an unsaturated compound having a modified functional group is thereafter added thereto to cause graft-modification therein, a method according to which a homopolymer and/or a copolymer each having an olefin unit are/is melted in an organic solvent such as toluene, xylene, or the like and an unsaturated compound having a modified functional group is thereafter added thereto to cause graft-modification therein, a method according to which a homopolymer and/or a copolymer each having an olefin unit are/is copolymerized with an unsaturated compound having a modified functional group, and the like.

Examples of the unsaturated compound having a modified functional group include α,β-unsaturated carboxylic acids such as (meth)acrylic acid, fumaric acid, maleic acid, itaconic acid, crotonic acid, and citraconic acid; α,β-unsaturated carboxylic acid anhydrides such as maleic acid anhydride, itaconic acid anhydride, and citraconic acid anhydride; and α,β-unsaturated carboxylic acid esters such as methyl maleate, methyl itaconate, methyl citraconate, methyl(meth)acrylate, ethyl(meth)acrylate, propyl(meth)acrylate, butyl(meth)acrylate, 2-ethylhexyl(meth)acrylate, dodecyl(meth)acrylate, tridecyl(meth)acrylate, stearyl(meth)acrylate, glycidyl(meth)acrylate, 2-hydroxyethyl(meth)acrylate, 2-hydroxypropyl(meth)acrylate, (2-isocyanato)ethyl(meth)acrylate, (dimethylamino)(meth)acrylate, (meth)acrylamide, and a transesterification product of ethylmethacrylate and an alcohol. Among these, preferably, the α,β-unsaturated carboxylic acid, the α,β-unsaturated carboxylic acid anhydrides, and the α,β-unsaturated carboxylic acid ester are used. Preferably, maleic acid is used as the α,β-unsaturated carboxylic acid. Preferably, maleic acid anhydride is used as the α,β-unsaturated carboxylic acid anhydrides, Preferably, the α,β-unsaturated carboxylic acid ester having four or more carbon atoms in an R-group in its ester moiety (—CO—O—R) is used, more preferably, the α,β-unsaturated carboxylic acid ester having six or more carbon atoms in an R-group in its ester moiety is used, and, further preferably, the α,β-unsaturated carboxylic acid ester having eight or more carbon atoms in an R-group in its ester moiety is used as the α,β-unsaturated carboxylic acid ester. Preferably, the α,β-unsaturated carboxylic acid ester having 30 or fewer carbon atoms in an R-group in its ester moiety is used and, more preferably, the α,β-unsaturated carboxylic acid ester having 20 or fewer carbon atoms in an R-group in its ester moiety is used as the α,β-unsaturated carboxylic acid ester. These may each be used alone, or two or more thereof may be used in combination. In the present invention, acrylic acids and (meth)acrylic acids are collectively referred to as "(meth)acrylic acids". Acrylates and methacrylates are collectively referred to as "(meth)acrylates".

Examples of the olefin unit constituting the crystalline polyolefin include a structural unit originated from ethylene and a structural unit originated from an α-olefin.

Examples of the α-olefin include, for example, propylene, 1-butene, 1-pentene, 4-methyl-1-pentene, 1-hexene, 1-heptene, 1-octene, 1-nonene, 1-decene, 1-undecene, 1-dodecene, 1-tridecene, 1-tetradecene, 1-pentadecene, 1-hexadecene, 1-heptadecene, 1-octadecene, 1-nonadecene, 1-eicosene, and vinylcyclohexane. Preferably, propylene and 1-putene are used.

Examples of the homopolymer comprising the olefin unit include homopolymers of ethylene and propylene.

Examples of the copolymer comprising the olefin unit include copolymers obtained from olefins such as an ethylene-propylene copolymer, a propylene-1-butene copolymer, an ethylene-1-butene copolymer, an ethylene-1-octene copolymer, an ethylene-1-hexene copolymer, and an ethylene-propylene-1-butene copolymer; copolymers obtained from a monomer copolymerizable with an olefin and the olefin; mixtures of two or more of these; and the like. For the copolymer of a monomer copolymerizable with an olefin and the olefin, the monomer polymerizable with the olefin and the olefin may each be used alone, or two or more thereof may be used in combination. The form of the copolymer may be any one of, for example, a random copolymer, a block copolymer, a graft copolymer, and the like. These may each be converted into the one having a low molecular weight or a high molecular weight using a peroxide or the like.

Preferably, the ethylene-propylene copolymer, the ethylene-1-butene copolymer, the ethylene-propylene-1-butene copolymer, and the like are used as the copolymer obtained from the olefins.

The α,β-unsaturated carboxylic acid, the α,β-unsaturated carboxylic acid anhydrides, and the α,β-unsaturated carboxylic acid ester listed above as the unsaturated compounds each comprising a modified functional group are each usable as the monomer that is copolymerizable with an olefin. In this case, the polyolefin (a) is obtained as the copolymer of the olefin and the unsaturated compound comprising a modified functional group.

Examples of the monomer copolymerizable with an olefin include a metallic salt of an α,β-unsaturated carboxylic acid, a vinyl ester, a vinyl ester saponified product, a cyclic olefin, a vinyl aromatic compound, a polyene compound (such as dienes), and (meth)acrylonitrile. These may each be used alone, or two or more thereof may be used in combination.

Examples of the metallic salt of the α,β-unsaturated carboxylic acid include a sodium salt and a magnesium salt of (meth)acrylic acid, and the like.

Examples of the vinyl ester include vinyl formate, vinyl acetate, vinyl propionate, vinyl pivalate, vinyl versatate, and the like. Among these, preferably, vinyl acetate is used.

Examples of the vinyl ester saponified product include a vinyl alcohol obtained by saponifying a vinyl ester using a basic compound or the like.

Examples of the cyclic olefin include, for example, norbornene, 5-methylnorbornene, 5-ethylnorbornene, 5-propylnorbornene, 5,6-dimethylnorbornene, 1-methylnorbornene, 7-methylnorbornene, 5,5,6-trimethylnorbornene, 5-phenylnorbornene, 5-benzylnorbornene, 5-ethylidenenorbornene, 5-vinylnorbornene, 1,4,5,8-dimethano-1,2,3,4,4a,5,8,8a-octahydronaphtalene, 2-methyl-1,4,5,8-dimethano-1,2,3,4,4a,5,8,8a-octahydronaphtalene, 2-ethyl-1,4,5,8-dimethano-1,2,3,4,4a,5,8,8a-octahydronaphtalene, 2,3-dimethyl-1,4,5,8-dimethano-1,2,3,4,4a,5,8,8a-octahydronaphtalene, 2-hexyl-1,4,5,8-dimethano-1,2,3,4,4a,5,8,8a-octahydronaphtalene, 2-ethylidene-1,4,5,8-dimethano-1,2,3,4,4a,5,8,8a-octahydronaphtalene, 1,5-dimethyl-1,4,5,8-dimethano-1,2,3,4,4a, 5,8,8a-octahydronaphtalene, 2-cyclohexyl-1,4,5,8-dimethano-1,2,3,4,4a,5,8,8a-octahydronaphtalene, 2-isobutyl-1, 4,5,8-dimethano-1,2,3,4,4a,5,8,8a-octahydronaphtalene, 1,2-dihydrodicyclopentadiene, 5-methoxynorbornene, 5,6- dicarboxylnorbornene anhydrate, 5-dimethylaminonorbornene, 5-cyanonorbornene, cyclopentene, 3-methylcyclopentene, 4-methylcyclopentene, 3,4-dimethylcyclopentene, 3,5-dimethylcyclopentene, cyclohexene, 3-methylcyclohexene, 4-methylcyclohexene, 3,4-dimethylcyclohexene, cycloheptene, and vinylcyclohexene.

Examples of the vinyl aromatic compound include, for example, styrene, α-methylstyrene, p-methylstyrene, vinylxylene, p-tert-butylstyrene, ethylstyrene, and vinylnaphtalene.

Examples of the polyene compound include, for example, linear or branched aliphatic conjugated polyene compounds, alicyclic conjugated polyene compounds, aliphatic unconjugated polyene compounds, alicyclic unconjugated polyene compounds, and aromatic unconjugated polyene compounds. These compounds may each comprise a substituent group such as an alkoxy group, an aryl group, an aryloxy group, an aralkyl group, an aralkyloxy group or the like.

Examples of the aliphatic conjugated polyene compound include, for example, 1,3-butadiene, isoprene, 2-ethyl-1,3-butadiene, 2-propyl-1,3-butadiene, 2-isopropyl-1,3-butadiene, 2-hexyl-1,3-butadiene, 2,3-dimethyl-1,3-butadiene, 2,3-diethyl-1,3-butadiene, 2-methyl-1,3-pentadiene, 2-methyl-1,3-hexadiene, 2-methyl-1,3-octadiene, 2-methyl-1,3-decadiene, 2,3-dimethyl-1,3-pentadiene, 2,3-dimethyl-1,3-hexadiene, 2,3-dimethyl-1,3-octadiene, and 2,3-dimethyl-1, 3-decadien.

Example of the alicyclic conjugated polyene compound include, for example, 2-methyl-1,3-cyclopentadiene, 2-methyl-1,3-cyclohexadiene, 2,3-dimethyl-1,3-cyclopentadiene, and 2,3-methyl-1,3-cyclohexadiene.

Examples of the aliphatic unconjugated polyene compound include, for example, 1,4-hexadiene, 1,5-hexadiene, 1,6-heptadiene, 1,6-octadiene, 1,7-octadiene, 1,8-nonadiene, 1,9-decadiene, 1,13-tetradecadiene, 5,9-decatriene, 3-methyl-1,4-hexadiene, 4-methyl-1,4-hexadiene, 5-methyl-1,4-hexadiene, 4-ethyl-1,4-hexadiene, 3-methyl-1,5-hexadiene, 3,3-dimethyl-1,4-hexadiene, 3,4-dimethyl-1,5-hexadiene, 5-methyl-1,4-heptadiene, 5-ethyl-1,4-heptadiene, 5-methyl-1,5-heptadiene, 6-methyl-1,5-heptadiene, 5-ethyl-1,5-heptadiene, 3-methyl-1,6-heptadiene, 4-methyl-1,6-heptadiene, 4,4-dimethyl-1,6-heptadiene, 4-ethyl-1,6-heptadiene, 4-methyl-1,4-octadiene, 5-methyl-1,4-octadiene, 4-ethyl-1,4-octadiene, 5-ethyl-1,4-octadiene, 5-methyl-1,5-octadiene, 6-methyl-1,5-octadiene, 5-ethyl-1,5-octadiene, 6-ethyl-1,5-octadiene, 6-methyl-1,6-octadiene, 7-methyl-1,6-octadiene, 6-ethyl-1,6-octadiene, 6-propyl-1,6-octadiene, 6-butyl-1,6-octadiene, 4-methyl-1,4-nonadiene, 5-methyl-1,4-nonadiene, 4-ethyl-1,4-nonadiene, 5-ethyl-1,4-nonadiene, 5-methyl-1,5-nonadiene, 6-methyl-1,5-nonadiene, 5-ethyl-1,5-nonadiene, 6-ethyl-1,5-nonadiene, 6-methyl-1,6-nonadiene, 7-methyl-1,6-nonadiene, 6-ethyl-1,6-nonadiene, 7-ethyl-1,6-nonadiene, 7-methyl-1,7-nonadiene, 8-methyl-1,7-nonadiene, 7-ethyl-1,7-nonadiene, 5-methyl-1,4-decadiene, 5-ethyl-1,4-decadiene, 5-methyl-1,5-decadiene, 6-methyl-1,5-decadiene, 5-ethyl-1,5-decadiene, 6-ethyl-1,5-decadiene, 6-methyl-1,6-decadiene, 6-ethyl-1,6-decadiene, 7-methyl-1,6-decadiene, 7-ethyl-1,6-decadiene, 7-methyl-1,7-decadiene, 8-methyl-1,7-decadiene, 7-ethyl-1,7-decadiene, 8-ethyl-1,7-decadiene, 8-methyl-1,8-decadiene, 9-methyl-1,8-decadiene, 8-ethyl-1,8-decadiene, 6-methyl-1,6-undecadiene, 9-methyl-1,8-undecadiene, 6,10-dimethyl-1,5,9-undecatriene, 5,9-dimethyl-1,4,8-decatriene, 4-ethylidene-8-methyl-1,7-nonadiene, 13-ethyl-9-methyl-1,9,12-pentadecatriene, 5,9,13-trimethyl-1,4,8,12-tetradecadiene, 8,14,16-trimethyl-1,7,14-hexadecatriene, and 4-ethylidene-12-methyl-1,11-pentadecadiene.

Examples of the alicyclic unconjugated polyene compound include, for example, vinylcyclohexene, 5-vinyl-2-norbornene, 5-ethylidene-2-norbornene, 5-methylene-2-norbornene, 5-isopropenyl-2-norbornene, cyclohexadiene, dicyclopentadiene, cyclooctadiene, 2,5-norbornadiene, 2-methyl-2,5-norbornadiene, 2-ethyl-2,5-norbornadiene, 2,3-diisopropylidene-5-norbornene, 2-ethylidene-3-isopropylidene-5-norbornene, 1,4-divinylcyclohexane, 1,3-divinylcyclohexane, 1,3-divinylcyclopentane, 1,5-divinylcyclooctane, 1-allyl-4-vinylcyclohexane, 1,4-diallylcyclohexane, 1-allyl-5-vinylcyclooctane, 1,5-diallylcyclooctane, 1-allyl-4-isopropenylcyclohexane, 1-isopropenyl-4-vinylcyclohexane, 1-isopropenyl-3-vinylcyclopentane, and methyltetrahydroindene.

Examples of the aromatic unconjugated polyene compound include, for example, divinylbenzene and vinylisopropenylbenzene.

Specific examples of the copolymer of the monomer copolymerizable with the olefin and the olefin include the following:

(i) ethylene-vinyl acetate copolymers, and saponified substances thereof or partially saponified substances thereof, (ii) ethylene-(meth)acrylic acid copolymers, (iii) ethylene-(meth)acrylate copolymers such as ethylene-glycidyl(meth)acrylate copolymers and ethylene-methyl (meth)acrylate copolymers, (iv) ethylene-alicyclic α-olefin copolymers such as ethylene-vinylcyclohexane.

(v) ethylene-vinyl acetate-(meth)acrylate copolymers such as ethylene-vinyl acetate-glycidyl(meth)acrylate copolymers and ethylene-vinyl acetate-methyl(meth)acrylate copolymers, (vi) ethylene-(meth)acrylate-maleic acid anhydride copolymers such as ethylene-ethyl(meth)acrylate-maleic acid anhydride copolymers, (vii) ethylene-(meth)acrylate-(meth)acrylate copolymers such as ethylene-glycidyl(meth)acrylate-methyl(meth)acrylate copolymers.

(viii) copolymers of metallic salts of the above, and (ix) blends of two or more of the above copolymers.

The homopolymers and the copolymers each comprising the olefin unit can be produced using a traditionally known polymerization method such as, for example, radical polymerization, cation polymerization, anion polymerization, or coordination polymerization, and each of these methods may be conducted with an aspect of living polymerization. The polymerization method may take any polymerization form such as solution polymerization, slurry polymerization, bulk polymerization, solid-phase polymerization, liquid-phase polymerization, of the like. For the solution polymerization and the slurry polymerization, examples of the solvent include, for example, aromatic hydrocarbons such as toluene and xylene, aliphatic hydrocarbons such as hexane, octane, and decane, alicyclic hydrocarbons such as cyclohexane and methylcyclohexane, halogenated hydrocarbons such as methylene chloride, carbon tetrachloride, and chlorobenzene, esters such as methyl acetate, ethyl acetate, propyl acetate, and butyl acetate, ketones such as acetone, methylethyl ketone, methylisobutyl ketone, and cyclohexanone, alcohols such as methanol, ethanol, n-propanol, isopropanol, and n-butanol, ethers such as dibutyl ether and tetrahydrofuran, and polar solvents such as dimethylformamide and dimethylsulfoxide. Among these, preferably, the aromatic hydrocarbons, the aliphatic hydrocarbons, and the alicyclic hydrocarbons are used and, more preferably, toluene, xylene, hexane, heptane, cyclopentane, and cyclohexane are used. These may each be used alone, or two or more thereof may be used in combination.

Preferably, a polyolefin having a polypropylene crystalline structure is used as the crystalline polyolefin. Whether a polymer has a polypropylene crystalline structure can easily be checked using an X-ray structural analysis. The amount of the structural unit originated from the propylene in the polyolefin having the propylene crystalline structure, preferably, is equal to or higher than 60% by mol, more preferably, is equal to or higher than 70% by mol, further preferably, is equal to or higher than 80% by mol, preferably, is equal to or lower than 100% by mol, more preferably, is equal to or lower than 99% by mol, further preferably, is equal to or lower than 98.5% by mol, and, especially preferably, is equal to or lower than 98% by mol relative to 100% by mol of the structural unit constituting the crystalline polyolefin.

The polyolefin (a) comprises the modified functional group unit originated from the unsaturated compound comprising the modified functional group by an amount, preferably, equal to or larger than 0.1 part by mass, more preferably, equal to or higher than 1 part by mass, further preferably, equal to or larger than 3 parts by mass relative to 100 parts by mass of the olefin unit. The polyolefin (a) comprises the modified functional group unit originated from the unsaturated compound comprising the modified functional group by an amount, preferably, equal to or smaller than 40 parts by mass, more preferably, equal to or smaller than 35 parts by mass, further preferably, equal to or smaller than 30 parts by mass relative to 100 parts by mass of the olefin unit. When the amount of the modified functional group unit is as above, this is advantageous from the viewpoint of compatibility with polyurethane.

The modified functional group unit in the polyolefin (a) may have maintained rings in its acid anhydride group or opened rings therein, or may have both of maintained rings and opened rings therein.

The weight average molecular weight Mw of the polyolefin (a) measured using gel permeation chromatography (GPC) and converted using the calibration curves of polystyrene, preferably, is equal to or greater than 20,000 and, more preferably, is equal to or greater than 30,000. The weight average molecular weight Mw of the polyolefin (a), preferably, is equal to or smaller than 200,000 and, more preferably, is equal to or smaller than 150,000. When the weight average molecular weight Mw is the above value, this is advantageous from the viewpoint of adhesiveness and compatibility with polyurethane.

The melting point of the polyolefin (a) measured using differential scanning calorimetry (DSC), preferably, is equal to or lower than 100° C., more preferably, is equal to or lower than 90° C., and, further preferably, equal to or lower than 80° C. In this specification, the melting point can be measured by, for example, the method described in Examples below.

The production method for the aqueous dispersion (A) is not limited and examples thereof include, for example, a method according to which a mixture of the polyolefin (a), and water and a solvent other than water is prepared and the solvent other than water is removed from the mixture to obtain the aqueous dispersion, and a method according to which the polyolefin (a) is melted at a temperature equal to or higher than the temperature at which the polyolefin (a) is melted and water is thereafter added to the melted polyolefin (a) to obtain the dispersion. The aqueous dispersion can directly be obtained by obtaining the polyolefin (a) by emulsion polymerization or suspension polymerization.

When an aqueous dispersion comprising a dispersoid whose particle diameter is minute, preferably, the method is employed, according to which a mixture of the polyolefin (a), and water and a solvent other than water is prepared and the solvent other than water is removed from the mixture to obtain the aqueous dispersion. In the case where the mixture is prepared, the mixture may be heated to 30 to 150° C. when necessary. The ratio of the solvent other than water in the aqueous dispersion (A) finally is usually equal to or lower than 50% by mass, preferably, is equal to or lower than 20% by mass, more preferably, is equal to or lower than 10% by mass, further preferably, is equal to or lower than 1% by mass, and, especially preferably, is 0% by mass relative to 100% by mass of the mixture of water and the solvent other than water.

Examples of the solvent other than water include, for example, aromatic hydrocarbons such as toluene and xylene, aliphatic hydrocarbons such as hexane, octane, and decane, alicyclic hydrocarbons such as cyclohexane and methylcyclohexane, halogenated hydrocarbons such as methylene chloride, carbon tetrachloride, and chlorobenzene, esters such as methyl acetate, ethyl acetate, propyl acetate, and butyl acetate, ketones such as acetone, methylethyl ketone, methylpropyl ketone, methylisobutyl ketone, and cyclohexanone, alcohols such as methanol, ethanol, n-propanol, isopropanol, n-butanol, 2-butanol, isobutanol, t-butanol, cyclohexanol, ethylene glycol, propylene glycol, and butadiol, ethers such as dipropyl ether, dibutyl ether, and tetrahydrofuran, organic solvents each having two or more functional groups such as 2-methoxyethanol, 2-ethoxyethanol, 2-buthoxyethanol, 2-methoxypropanol, 2-ethoxypropanol, and diacetone alcohol, and polar solvents such as dimethylformamide and dimethylsulfoxide.

Among these, the solvents each soluble in water at a ratio, preferably, equal to or higher than 1% by mass and, more preferably, equal to or higher than 5% by mass, and, preferably, for example, methylethyl ketone, methylpropyl ketone, cyclohexanone, n-propanol, isopropanol, n-butanol, 2-butanol, isobutanol, t-butanol, cyclohexanol, tetrahydrofuran, 2-methoxyethanol, 2-ethoxyethanol, 2-buthoxyethanol, 2-methoxypropanol, 2-ethoxypropanol, and diacetone alcohol are used.

For example, a reaction tank with a stirring apparatus, or one- or two-shaft kneader can be used as an apparatus that produces the aqueous dispersion by melting the polyolefin (a) in a solvent or melting the polyolefin (a) and thereafter adding water thereto. The stirring rate in this case somewhat differs depending on the selection of the apparatus while the stirring rate usually is in the range of 10 to 10,000 rpm.

The average particle diameter of the dispersoid comprised in the aqueous dispersion (A), preferably, is equal to or smaller than 1 μm, more preferably, equal to or smaller than 0.9 μm, and, further preferably, equal to or smaller than 0.8 μm. In this specification, the "dispersion" is a concept of the state where highly fine particles are dispersed each as a monomolecule and even includes the state that can be described as substantial dissolution. The lower limit value of the average particle diameter is not especially limited while the lower limit value is, for example, equal to or larger than 0.01 μm. In this specification, the measurement of the average particle diameter can be measured using, for example, a particle size distribution measuring apparatus.

Preferably, the dispersoid of the aqueous dispersion (A) is a self-emulsion of the non-chlorine modified crystalline polyolefin. Preferably, the polyolefin (a) therefore has a self-emulsifying property. When the polyolefin (a) has the self-emulsifying property, this is advantageous because the aqueous dispersion (A) can be produced without using any emulsifier and any dispersant. In the case where the emulsifying property of the resin itself is weak, when emulsion polymerization is conducted or depending on another purpose, another use, and the like, a surfactant may be used as necessary.

For example, a cationic surfactant, an anionic surfactant, a non-ionic surfactant, an ampholytic surfactant, a reactive surfactant, and the like can be used as the surfactant. When the surfactant is used, a surfactant is used that has as a hydrophobic group an alkyl group, an alkenyl group, an alkylaryl group, or an alkenylaryl group having usually 4 or more carbon atoms, preferably, 8 or more carbon atoms, and, more preferably, 12 or more carbon atoms. The number of carbon atoms however is usually equal to or lower than 30.

Example of the cationic surfactant include, for example, stearyltrimethylammonium chloride and cetyltrimethylammonium bromide.

Examples of the ampholytic surfactant include, for example, lauryldimethylaminoacetic acid betaine.

Examples of the anionic surfactant include, for example, sodium dodecylbenzene sulfonate, sodium sulfoscuccinate, sodium lauryl sulfate, and sodium polyoxyethylenelaurylether sulfate.

Examples of the non-ionic surfactant include, for example, polyoxyethylenecetyl ether, polyoxyethylenestearyl ether, polyoxyethylenenonylphenyl ether, and polyoxyethylenesorbitan monolaurate.

The what-is-called reactive surfactant having a radical-polymerizable functional group, and the like can be used as the surfactant. When the reactive surfactant is used, water resistance of a coated film formed using this dispersion can be improved. Examples of the typical commercially available reactive surfactant include those of "Ereminor" series (produced by Sanyo Chemical Industries, Ltd.), those of "Ratemul" series (produced by Kao Corp.), and those of "Aqualon" series (produced by DKS Co., Ltd.).

For the aqueous dispersion (A), when necessary, a part or all of carboxyl groups in the polyolefin (a) may be neutralized by an amine compound or an emulsifier may be added thereto.

Examples of the amine compound include, for example, tertiary amines such as triethylamine, tributylamine, dimethylethanolamine, and triethanolamine; secondary amines such as diethylamine, dibutylamine, diethanolamine, and morpholine; and primary amines such as propylamine, and ethanolamine.

When the amine compound is used, the use amount thereof is advantageously in the range of 0.1 to 5.0 molar equivalents relative to the carboxyl groups in the polyolefin (a). Preferably, the range is in the range of 0.1 to 3.0 molar equivalents and, more preferably, the range is in the range of 0.1 to 1.0 molar equivalent relative thereto.

The aqueous dispersion (A) comprises a non-volatile content at a rate, preferably, equal to or higher than 5% by mass, more preferably, equal to or higher than 15% by mass, further preferably, equal to or higher than 30% by mass, and, usually, equal to or lower than 60% by mass relative to the overall aqueous dispersion (A). In the present invention, the non-volatile content refers to the mass of the residue obtained by removing the solvent from the aqueous dispersion, and this mass is measured in accordance with JIS K 6828-1.

The polyurethanes (b) and (c) used in the present invention each comprise at least one type of polymer selected from the group consisting of polyurethane, polyurea, and polyurethane-polyurea.

The polyurethane, the polyurea, and the polyurethane-polyurea each are usually obtained by reacting the following components and, each comprise the structural units originated from the components:
(o) at least one type of diol component and/or polyol component,
(p) at least one type of diisocyanate component and/or polyisocyanate component,
(q) at least one type of component having at least one hydrophilic group,
(r) optionally, an amino compound and/or a hydroxyamino compound each having mono-, di-, and/or tri-functionality, and
(s) optionally, a compound having reactivity with another isocyanate, A proper diol and/or polyol component(s) (o) have/has at least two isocyanate-reactive hydrogen atoms and have/has an average molecular weight of, preferably, 62 to 18,000 g/mol and, more preferably, 62 to 4.000 g/mol. Examples of the component (o) include, for example, polyether polyol, polyester polyol, polycarbonate polyol, and polylactone polyol. The advantageous component (o) has, preferably, 2 to 4, especially preferably, 2 or 3, and, most preferably, two hydroxyl groups. A mixture of such various types of compound is also suitable.

The polyester polyol can be produced adjusting the production conditions for a polyester and is a polyester that has hydroxyl groups at least on both ends of the main chain. Examples of the polyester polyol include linear polyester diols and slightly-branched polyester polyols. These diols and polyols can each be produced using a known method using an aliphatic, an alicyclic, or an aromatic dicarboxylic acid and a diol, and optionally using a polyhydric carboxylic acid and/or a highly functional polyol. Examples of the dicarboxylic acid include, for example, succinic acid, methylsuccinic acid, glutaric acid, adipic acid, pimelic acid, suberic acid, azelaic acid, sebacic acid, nonanedicarboxylic acid, decanedicarboxylic acid, terephthalic acid, isophthalic acid, o-phthalic acid, tetrahydrophthalic acid, hexahydrophthalic acid, cyclohexanedicariboxylic acid, maleic acid, fumaric acid, and malonic acid, and anhydrides such as o-phthalic acid anhydride, and succinic anhydride. Examples of the polyhydric carboxylic acid include, for example, trimellitic acid and trimellitic acid anhydride. An ester of a lower alcohol such as methanol and the dicarboxylic acid or the polyhydric carboxylic acid may also be used as the dicarboxylic acid or the polyhydric carboxylic acid. The dicarboxylic acid and the polyhydric carboxylic acid may each be used alone, or two or more thereof may be used in combination. Examples of the diol include, for example, ethanediol, diethylene glycol, triethylene glycol, tetraethylene glycol, 1,2-propanediole, dipropylene glycol, tripropylene glycol, tetrapropylene glycol, 1,3-propanediol, 1,4-butanediol, 1,3-butanediol, 2,3-butanediol, 1,5-pentanediol, 1,6-hexanediol, 2,2-dimethyl-1,3-propanediol, 1,4-dihydroxycyclohexane, 1,4-dimethylolcyclohexane, 1,8-octanediol, 1,10-decanediol, and 1,12-dodecanediol. Examples of the highly functional polyol include trifunctional and higher functional polyols such as, for example, trimethylolpropane, glycerol, and pentaetythritol. An alicyclic or an aromatic dihydroxyl compound and an alicyclic or an aromatic polyhydroxyl compound are also suitably used as the diol and the highly functional polyol. The diol and the highly functional polyol may each be used alone, or two or more thereof may be used in combination.

The polylactone polyol is a homopolymer or a copolymer of lactone and is a polylactone prepared to have hydroxyl groups at least on both ends of the main chain.

The polycarbonate polyol is a polycarbonate that is produced by adjusting the production conditions for a polycarbonate and that has hydroxyl groups at least on both ends of the main chain.

Examples of the polyether polyol include polyadducts of cyclic ethers, and condensates of polyhydric alcohols. Examples of the cyclic ether include, for example, styrene oxide, ethylene oxide, propylene oxide, tetrahydrofuran, butylene oxide, and epichlorohydrin, and these may each be used alone, or two or more thereof may be used as a mixture. Examples of the polyhydric alcohol include the above diols and the highly functional polyols, and these may each be used alone, or two or more thereof may be used as a mixture. For example, a polyadduct of tetrahydrofuran is known as polytetramethyleneether glycol (PTMG). Preferably, a homopolymer of each of, a mixed polymer of, and a grafted polymer of propylene oxide and ethylene oxide are used as the polyether polyol.

Examples of the component (o) that is suitable include diols, triols, and/or tetraols of low molecular weight compounds. Examples thereof include, for example, ethane diol, diethylene glycol, triethylene glycol, and tetraethylene glycol, 1,2-propane diol, dipropylene glycol, tripropylene glycol, tetrapropylene glycol, 1,3-propanediol, 1,4-butanediol, 1,3-butanediol, 2,3-butanediol, 1,5-pentanediol, 1,6-hexanediol, 2,2-dimethyl-1,3-propanediol, 1,4-dihydroxycyclohexane, 1,4-dimethylcyclohexane, 1,8-octanediol, 1,10-decanediol, 1,12-dodecanediol, neopentyl glycol, 1,4-cyclohexanediol, 1,4-cyclohexanedimethanol, 1,4-dihydroxybenzene, 1,3-dihydroxybenzene, 1,2-dihydroxybenzene, 2,2-bis(4-hydroxyphenyl)-propane (bisphenol A), TCD-diol, trimethylolpropane, glycerol, pentaerythritol, and dipentaerythritol, and these may each be used alone, or two or more thereof may be used as a mixture.

Reaction products of the diols, the triols, and/or the tetraols of low molecular weight compounds with ethylene oxides and/or propylene oxides can also be used as the component (o).

The component (o) is present in the polyurethane (b) or (c) in an amount of, preferably, 20 to 95% by mass, more preferably, 30 to 90% by mass, and, further preferably, 65 to 90% by mass.

The component (p) is an organic compound having at least two free isocyanate groups per one molecule and, preferably, a diisocyanate $Y(NCO)_2$ [where Y represents a $C_{4-12}$ divalent aliphatic hydrocarbon group, a $C_{6-15}$ divalent alicyclic hydrocarbon group, a $C_{6-15}$ divalent aromatic hydrocarbon group, or a $C_{7-15}$ divalent aralphatic hydrocarbon group] is used. Examples of the preferably used diisocyanate include tetramethylene diisocyanate, methylpentamethylene diisocyanate, hexamethylen diisocyanate, dodecamethylene diisocyanate, 1,4-diisocyanatocyclohexane, 1-isocyanato-3,3,5-trimethyl-5-isocyanatomethylcyclohexane (=IPDI, isophorone diisocyanate), 4,4'-diisocyanatodicyclohexylmethane, 4,4'-diisocyanatodicyclohexylpropane-(2,2), 1,4-diisocyanatobenzene, 2,4-diisocyanatotoluene, 2,6-diisocyanatotoluene, 4,4'-diisocyanatodiphenylmethane, 2,2'-diisocyanatodiphenylmethane, 2,4'-diisocyanatodiphenylmethane, tetramethylxylylene diisocyanate, p-xylylene diisocyanate, p-isopropylidene diisocyanate, and a mixture of any combination of these compounds.

In addition to these simple diisocyanates, an isocyanate whose isocyanate group is bonded to a hetero atom-containing group and/or a polyisocyanate having three or more isocyanate groups per one molecule are/is also suitable. This polyisocyanate is prepared by, for example, modifying an aliphatic, an alicyclic, an araliphatic, and/or an aromatic simple diisocyanate, comprises at least two types of diisocyanate, and is a polyisocyanate having a uretdione, an isocyanurate, a urethane, an allophanate, a biuret, a carbodiimide, an iminooxadiazinedione, and/or an oxadiazinetrione structure. Examples of a native polyisocyanate having three or more isocyanate groups per one molecule include 4-isocyanatomethyl-1,8-octanediisocyanate (nonanetriisocyanate).

Preferably, examples of the component (p) include hexamethylene diisocyanate (=HDI), dodecamethylene diisocyanate, 1,4-diisocyanatocyclohexane, 1-isocyanato-3,3,5-trimethyl-5-isocyanatomethylcyclohexane (=IPDI), 4,4'-diisocyanatodicyclohexylmethane, 2,4'-diisocyanatotoluene, 2,6-diisocyanatotoluene, 4,4'-diisocyanatodiphenylmethane, 2,2'-diisocyanatodiphenylmethane, 2,4'-diisocyanatodiphenylmethan, and a mixture of any combination of these compounds.

The component (p) is present in the polyurethane (b) or (c) in an amount of, usually, 5 to 60% by mass, preferably, 6 to 50% by mass, and, more preferably, 7 to 40% by mass.

The component (q) that is suitable is, for example, a component having a sulfonate group and/or a carboxylate group, and examples thereof include, for example, a diamino compound and a dihydroxy compound each having a sulfonate group and/or a carboxylate group. Examples of the component (q) include, for example, N-(2-aminoethyl)-2-aminoethanesulfonic acid,
N-(3-aminopropyl)-2-aminoethanesulfonic acid,
N-(3-aminopropyl)-3-aminopropanesulfonic acid,
N-(2-aminoethyl)-3-aminopropanesulfonic acid,
dimethylolpropionic acid, dimethylolbutyric acid, and
a sodium salt, a lithium salt, a potassium salt, and a tertiary amine salt each of a reaction product in accordance with Michael addition of a diamine (for example, 1,2-ethanediamine or isophoronediamine) and an acrylic acid or a maleic acid whose mol amount is a two-fold amount of the diamine.

Examples of the tertiary amine especially suitable for forming the salts and advantageously used include, for example, triethylamine, dimethylcyclohexylamine, and ethyldiisopropylamine. Another amine can also be used for forming the salts and examples thereof include ammonia, diethanolamine, triethanolamine, dimethylethanolamine, methyldiethanolamine, aminomethylpropanol, and a mixture of the above and other amines. Preferably, these amines are not added until the prepolymer is produced.

Another neutralizer may be used and examples thereof include sodium hydroxide, potassium hydroxide, lithium hydroxide, or calcium hydroxide for purpose of neutralization.

A polyether having a nonionic hydrophilic function, that is formed by adding ethyleneoxide, or ethyleneoxide and propyleneoxide to an alcohol or an amine can also be used as another suitable component (q).

Examples of the preferred component (q) include N-(2-aminoethyl)-2-aminoethanesulfonate, dimethylolpropionate, and dimethylolbutyrate.

The component (q) is present in the polyurethane (b) or (c) in an amount of, preferably, 0.1 to 15% by mass, more preferably, 0.5 to 10% by mass, further preferably, 0.8 to 5% by mass, and, especially preferably, 0.9 to 3.0% by mass.

The component (r) that is suitable is a monofunctional, a difunctional or a trifunctional amine and/or a monofunctional, a difunctional or a trifunctional hydroxyamine. Examples of the component (r) include, for example, an aliphatic and/or an alicyclic primary and/or secondary monoamine (ethylamine, diethylamine, and an isomeric propylamine and an isomeric butylamine as specific examples), and a higher linear aliphatic monoamine and an alicyclic monoamine (cyclohexylamine as a specific example). Other examples thereof include amino alcohol, that is, a compound having an amino group and a hydroxyl group in one molecule such as, for example, ethanol amine, N-methylethanolamine, diethanolamine, diisopropanolamine, 1,3-diamino-2-propanol, N-(2-hydroxyethyl)ethylenediamine, N,N-bis(2-hydroxyethyl)ethylenediamine, and 2-propanol amine. Other examples thereof include a diamine and a triamine such as, for example, 1,2-ethanediamine, 1,6-hexamethylenediamine, 1-amino-3,3,5-trimethyl-5-aminomethylcyclohexane(isophoronediamine), piperazine, 1,4-diaminocyclohexane, bis(4-aminocyclohexyl) methane, and diethylenetriamine. Adipic acid hydrazide, hydrazine, and hydrazine hydrate are also suitable as the component (r). These may each be used alone, or two or more thereof may be used as a mixture as the component (r).

Preferably, the component (r) is 1,2-ethanediamine, 1-amino-3,3,5-trimethyl-5-aminomethylcyclohexane, diethylenetriamine, diethanolamine, ethanolamine, N-(2-hydroxyethyl)ethylenediamine, or N,N-bis(2-hydroxyethyl)ethylenediamine.

Preferably, the component (r) acts as a chain extender to increase the molecular weight or acts as a monofunctional compound to limit the molecular weight, and/or, depending on the case, additionally incorporates a further reactive group (for example, a free hydroxyl group) as a further cross-linkage site.

The component (r) is present in the polyurethane (b) or (c) in an amount of, preferably, 0 to 10% by mass, more preferably, 0 to 5% by mass, and, further preferably, 0.2 to 3% by mass.

Examples of the component (s) additionally used depending on the case include, for example, an aliphatic, an alicyclic, or an aromatic C2 to 22 monoalcohol. Examples of the C2 to 22 monoalcohol include, for example, ethanol, butanol, hexanol, cyclohexanol, isobutanol, benzyl alcohol, stearyl alcohol, and 2-ethylethanol. A blocking agent usually used for an isocyanate group and capable being removed again at a high temperature can be used as the component (s) and examples thereof may include, for example, butanoneoxime, dimethylpyrazole, caprolactam, malonic acid ester, triazole, dimethyltriazole, tert-butylbenzylamine, and cyclopentanoncarboxyethyl ester.

The component (s) may be present in the polyurethane (b) or (c) in an amount of, preferably, 0 to 20% by mass and, more preferably, 0 to 10% by mass.

In a preferred aspect of the present invention, the polyurethane (b) comprises at least one type of crystalline polyurethane or a crystalline polyurethane-polyurea.

In this specification, the crystalline polyurethane means that, in DSC measurement, a polymer has a melting peak of the crystal melting heat amount of equal to or larger than 3 J/g, preferably, equal to or larger than 5 J/g, especially preferably, equal to or larger than 10 J/g, and, further preferably, equal to or larger than 30 J/g. The melting peak is caused by melting of the structure in the regular portion in the polymer.

The crystalline polyurethane (b) is obtained by using, preferably, a polyester polyol that is based on a linear dicarboxylic acid and an aliphatic, or an alicyclic linear or branched polyol as the component (o). Especially preferably, the dicarboxylic acid selected from the group consisting of adipic acid, succinic acid, sebacic acid, and dodecanedioic acid is used as the linear dicarboxylic acid for the component (o). Most preferably, adipic acid is used. The linear dicarboxylic acid is used in an amount of, preferably, at least 80% by mol, more preferably, 85 to 100% by mol, and, especially preferably, 90 to 100% by mol based on the total amount of all the carboxylic acids used for the component (o).

An aliphatic, an alicyclic, or an aromatic dicarboxylic acid other than the linear dicarboxylic acid (hereinafter, also referred to as "another carboxylic acid") may additionally be used depending on the case. Examples of the other carboxylic acid include glutaric acid, azelaic acid, 1,4-cyclohexanedicarboxylic acid, 1,3-cyclohexanedicarboxylic acid, 1,2-cyclohexanedicarboxylic acid, terephthalic acid, and isophthalic acid. The other carboxylic acid is used in an amount of equal to or lower than 20% by mol, preferably, 0 to 15% by mol, and, especially preferably, 0 to 10% by mol relative to the total amount of all the carboxylic acids used for the component (o).

Preferably, a diol is used as the aliphatic or the alicyclic linear or branched polyol. Preferably, the diol for the component (o) in the polyurethane (b) is selected from the group consisting of monoethylene glycol, 1,3-propane diol, 1,4-butane diol, 1,5-pentane diol, 1,6-hexane diol, and neopentyl glycol. Especially preferably, 1,4-butane diol and 1,6-hexane diol are each used as the diol and, most preferably, 1,4-butane diol is used. The diol is used in an amount of, preferably, at least 80% by mol, and, especially preferably, 90 to 100% by mol based on the total amount of all the polyols.

An aliphatic or an alicyclic linear or branched polyol other than the diol (hereinafter, also referred to as "another polyol") may additionally be used depending on the case. Examples of the other polyol include diethylene glycol, hydroxypivalic acid neopentyl glycol, cyclohexanedimethanol, 1,5-pentane diol, 1,2-pentane diol, 1,9-nonane diol, trimethylolpropane, glycerol, and pentaerythritol. The other polyol is used in an amount of, preferably, equal to or lower than 20% by mol and, especially preferably, at 0 to 10% by mol based on the total amount of all the polyols.

A mixture of two or more types of the polyester polyol is also suitable as the component (o).

Preferably, the polyurethane (b) includes a polyester structure based on adipic acid and 1,4-butane diol, or adipic acid and 1,6-hexane diol as a crystalline component.

In this specification, the non-crystalline polyurethane means that, in DSC measurement, the crystal melting heat amount is smaller than 3 J/g. This is achieved by not introducing the highly crystalline regular structure contained in the polyurethane (b) or limiting the amount thereof to be introduced. The component of the polyurethane (c) is not especially limited while the above various composition components are usable under the condition that the crystal melting heat amount thereof is smaller than 3 J/g.

Preferably, the polyurethane (b) and the polyurethane (c) are each a polyurethane that comprises, as the constituting components of the polyurethane, one or more structural unit(s) selected from the group consisting of an aliphatic diisocyanate, an alicyclic diisocyanate, and an aromatic diisocyanate, and one or more structural unit(s) selected from the group consisting of polyester polyol, polycarbonate polyol, and polytetramethyleneether glycol.

Preferably, the polyurethane (b) has a carboxyl group and/or a sulfonyl group.

The aqueous dispersions (B) and (C) each independently comprise a non-volatile content of, preferably, 15 to 70% by mass and, more preferably, 25 to 60% by mass relative to the overall aqueous dispersion. A pH values of the aqueous dispersions (B) and (C) are each independently, preferably, in the range of 4 to 11 and, more preferably, in the range of 6 to 10.

Each of the polyurethanes (B) and (C) can be prepared by producing an isocyanate-functional prepolymer by reacting the components (o) and (p), optionally (q), and optionally (s) in a one stage- or a two stage-reaction, and reacting, depending on the case, the obtained isocyanate-functional prepolymer with the component (q), and optionally (r) in a one stage- or a two-stage reaction, and dispersing the obtained substance in water or adding water to the obtained substance to disperse the substance therein. A portion or all of the additionally used solvent can be distilled away during the dispersion or after the dispersion.

The production method for each of the polyurethanes (b) and (c) can be conducted in a uniform phase in one or more stages, or partially in a dispersal phase when multi-stage reaction is used. After completely or partially conducting the polyaddition, the step of dispersion, emulsification, or melting is conducted. Depending on the case, further polyaddition or further modification may be conducted in the dispersal phase. All of the methods known based on the traditional techniques are usable for the production such as, for example, an emulsification equipment/shear force method, an acetone method, a prepolymer mixing method, a melting emulsification method, a ketimine method, and a solid natural dispersion method, and their modified methods.

Basically, all the hydroxyl-functional components are weighed and added, all the isocyanate-functional components are added, this mixture is reacted to produce an isocyanate-functional polyurethane, and the isocyanate-functional polyurethane can be reacted with the amino-functional component. The final product can also be obtained by employing a reverse production procedure, that is, the isocyanate component is introduced into a reaction container, the hydroxyl-functional component is added thereto, the content is reacted to produce a polyurethane, and the polyurethane is reacted with the amino-functional component.

To prepare the polyurethane polymer, usually, the hydroxyl-functional component (o), all of or a portion of (q) optionally and (s) optionally are introduced into a reaction tank, the content is diluted by a solvent that is inert for any isocyanate group but that is water-miscible depending on the case, and the content is homogenized. The component (p) is weighed and added at a temperature of room temperature to 120° C. to produce the isocyanate-functional polyurethane. This reaction can be conducted in one stage or multiple stages. The one-stage reaction can be conducted by, for example, introducing the component(s) (q) and/or (s) into a reaction tank, after the reaction thereof with the isocyanate-functional component (p), adding the component (o) thereto to react with the final portion of the isocyanate group still present therein.

Examples of the suitable solvent include, for example, acetone, methylisobutyl ketone, butanone, tetrahydrofuran, dioxane, acetonitrile, dipropyleneglycoldimethyl ether, and 1-methyl-2-pyrolidone. These solvents can not only be added at the start of the production but also be gradually added after the start of the production depending on the case. Preferably, acetone and butanone are used. The reaction can be conducted under a standard pressure or a high pressure.

To prepare the prepolymer, the hydroxyl-functional component and, depending on the case, the amino-functional component are used by amounts to have the isocyanate index of, preferably, 1.05 to 2.5, especially preferably, 1.15 to 1.95, and, most preferably, 1.2 to 1.7.

A further reaction of the isocyanate-functional prepolymer, the other hydroxyl-functional and/or amino-functional, preferably, completely amino-functional component (r), and, depending on the case, (q), that is, what-is-called chain extension is conducted to have the reaction ratios of the hydroxyl group and/or the amino group of, preferably, 25 to 150% by mol and, especially preferably, 40 to 85% by mol relative to 100% by mol of the isocyanate group.

To promote the isocyanate addition reaction, the ordinary catalyst known to those skilled in the art as an agent to promote an NCO—OH reaction may be used. Examples thereof include triethylamine, 1,4-diazabicyclo-[2,2,2]-octane, dibutyl tin oxide, tin octanoate, dibutyltin dilaurate, tinbis(2-ethylhexanoate), dioctanoate zinc, zincbis(2-ethylhexanoate), and other organic metal compounds.

The chain extension of the isocyanate-functional prepolymer with the component (r), and optionally (q) may be conducted before the dispersion, during the dispersion, or after the dispersion. Preferably, the chain extension is conducted before the dispersion. When the component (c) is used as the chain extending component, it is essential that this component is used to extend the chain before the dispersion step.

The chain extension is conducted at a temperature of usually 10 to 100° C. and, preferably, 25 to 60° C.

When the chain extending component is added to the reaction mixture, the chain extending component can also be diluted by an organic solvent and/or water. The chain extending component can be added in desired order or can simultaneously be added by adding the mixture.

To produce the aqueous dispersion comprising the polyurethane as the dispersoid, the prepolymer is introduced into the water for the dispersion associated with, depending on the case, strong shear (for example, heavy stirring), or, reversely, the water for the dispersion is mixed with the prepolymer being stirred. When the chain extension is not yet conducted in a uniform phase, this can be conducted.

The organic solvent usable depending on the case (for example, acetone) may be distilled away during and/or after the dispersion.

A preferred production method will be described below:

The component (o), optionally the component (q), optionally the component (s), and optionally the solvent are introduced into a reaction tank to be heated at a temperature of 20 to 100° C. The component (p) is weighed and added as quickly as possible being stirred. Using the reaction heat, the reaction mixture is stirred at a temperature of 40 to 150° C. to the extent that the isocyanate content reaches the theoretical value or substantially becomes a value slightly lower than the theoretical value. A catalyst may be added depending on the case. The mixture is diluted until the time when a solid substance of usually 25 to 95% by mass and, preferably, 35 to 80% by mass is obtained by addition of a solvent, and the component (r) diluted by water and/or the solvent is added associated with the component (q) depending on the case to thereby conduct the chain extension at a temperature of 30 to 120° C. After a reaction time period of 2 to 60 minutes, the dispersion is conducted by adding distilled water or mixing with distilled water in the tank. A portion or all of the used solvent is distilled away during the dispersion step or after the dispersion step.

The dispersion can be used alone, or together with a binder, an auxiliary agent, and an additive (especially, emulsifier, a light stabilizer such as, for example, a UV absorber, or a sterically hindered amine (HALS), an antioxidant, a filler, an auxiliary agent such as, for example, an antisetting agent, an antifoam agent, and/or a wetting agent, a flow improver, a reactive diluting agent, a plasticizer, a neutralizer, a catalyst, an auxiliary agent solvent, and/or a thickener, and an additive such as, for example, a pigment, a coloring agent, or a matting agent) that are known in relation to the techniques of coating and adhesives. A tackifier can also be added. The additive can be added to the product of the present invention immediately before the processing. At least some of the additives can be added before the dispersion or during the dispersion of the binder.

The polyurethanes (b) and (c) each having an acid value equal to or greater than 0 mgKOH/g are each advantageously and independently used. Preferably, the acid value of the polyurethane (b) is equal to or greater than 3 mgKOH/g and, more preferably, in the range of 10 mgKOH/g or greater. The upper limit value of the acid value is not especially limited and is, for example, 500 mgKOH/g. The acid value can generally be quantified using a KOH water solution titration method as the measurement method for the acid value.

The glass transition points of the polyurethanes (b) and (c) measured by DSC are each independently, preferably, equal to or lower than −20° C., more preferably, equal to or lower than −30° C., and further preferably, equal to or lower than −40° C. The lower limit value of the glass transition point is not especially limited and is, for example, −80° C.

The number average molecular weights Mw of the polyurethanes (b) and (c) are each independently, preferably, equal to or larger than 10,000, more preferably, equal to or larger than 100,000, and, further preferably, equal to or larger than 500,000. The upper limit value of the number average molecular weight Mw is not especially limited and is, for example, 10,000,000.

The melting point measured by DSC of the polyurethane (b) is, preferably, equal to or lower than 100° C., more preferably, equal to or lower than 90° C., and, further preferably, equal to or lower than 80° C. The polyurethane (c) has no clear melting point measured by DSC.

The crystal melting heat amount measured by DSC of the polyurethane (b) is equal to or larger than 3 J/g, more preferably, equal to or larger than 5 J/g, further preferably, equal to or larger than 10 J/g, and, especially preferably, equal to or larger than 30 J/g.

The crystal melting heat amount measured by DSC of the polyurethane (c) is smaller than 3 J/g.

The average particle diameters of the dispersoids of the aqueous dispersions (B) and (C) are each independently, preferably, equal to or smaller than 1.0 μm, more preferably, equal to or smaller than 0.9 μm, and, further preferably, equal to or smaller than 0.8 μm. The lower limit values of the average particle diameters of the dispersoids of the aqueous dispersions (B) and (C) are not especially limited and are each independently, for example, 0.001 μm, 0.01 μm, or the like.

The aqueous dispersion mixture of the present invention comprises the aqueous dispersions (A), (B), and (C) such that the non-volatile content of the aqueous dispersion (B) is 30 parts by mass to 100 parts by mass and the non-volatile content of the aqueous dispersion (C) is 20 parts by mass to 80 parts by mass relative to 100 parts by mass of the non-volatile content of the aqueous dispersion (A).

Preferably, the aqueous dispersion mixture of the present invention comprises the aqueous dispersions (A), (B), and (C) such that the non-volatile content of the aqueous dispersion (B) is 30 parts by mass to 95 parts by mass and the non-volatile content of the aqueous dispersion (C) is 20 parts by mass to 75 parts by mass relative to 100 parts by mass of the non-volatile content of the aqueous dispersion (A). The non-volatile contents can each be determined from the weight measurement of the residue remaining after the solvent is removed from the aqueous dispersion.

The aqueous dispersion mixture of the present invention comprises water as a dispersion medium. The aqueous dispersion mixture of the present invention comprises the non-volatile content of, preferably, equal to or higher than 5% by mass, more preferably, equal to or higher than 15% by mass, further preferably, equal to or higher than 30% by mass, and, usually, equal to or lower than 70% by mass relative to the overall aqueous dispersion mixture.

The aqueous dispersion mixture of the present invention can be formed as an aqueous paint composition by combining with a pigment (D), a viscosity modifier (E), a solvent (F), an auxiliary resin (G), and other additives (H) each within the range not significantly degrading the effect of the present invention.

Preferably, the aqueous paint composition of the present invention comprises 1 to 200 parts by mass of the above (D), 0 to 50 parts by mass of the above (E), 0 to 1,000 parts by mass of the above (F), 0 to 50 parts by mass of the above (G), and 0 to 100 parts by mass of the above (H) relative to 100 parts by mass of the non-volatile content of the aqueous dispersion (A).

More preferably, the aqueous paint composition of the present invention comprises 1 to 100 parts by mass of the above (D), 0 to 30 parts by mass of the above (E), 10 to 1,000 parts by mass of the above (F), 0 to 30 parts by mass of the above (G), and 0 to 80 parts by mass of the above (H) relative to 100 parts by mass of the non-volatile content of the aqueous dispersion (A).

For example, an ordinary pigment can be used as the pigment (D). The usable pigments are not especially limited and examples thereof include, for example, coloring pigments such as inorganic pigments such as titanium oxide, carbon black, iron oxide, chromium oxide, iron blue, colcothar, chrome yellow, and yellow iron oxide, and organic pigments such as azo-based pigments, anthracene-based pigments, perinone-based pigments, perylene-based pigments, quinacridone-based pigments, isoindolinone-based pigments, indigo-based pigments, and phthalocyanine-based pigments; extender pigments such as talc, calcium carbonate, clay, kaolin, silica, and precipitated barium sulfate; electrically conductive pigments such as conductive carbon, and whisker coated with tin oxide doped with antimony; and non-colored or colored metal glittering materials such as metals or alloys such as aluminum, copper, zinc, nickel, tin, and aluminum oxide, and one type of these may be used, or two or more types thereof may concurrently be used.

When the pigment is used, a pigment dispersant may be used. Examples thereof include, for example, an aqueous acrylic resin such as Joncryl produced by BASF Japan; an acidic block copolymer such as BYK-190 produced by BYK Japan K.K.; a styrene-maleic acid copolymer; an acetylene diol derivative such as Surfynol T324 produced by Air Products, Inc. (Air Product, Inc.); and a water soluble carboxymethylacetatebutyrate such as CMCAB-641-0.5 produced by Eastman Chemical, Co., Ltd. A pigment paste whose pigment dispersion is stable can be prepared by using these pigment dispersants.

The viscosity modifier (E) is an agent to be added to adjust the viscosity of the aqueous dispersion to be suitable, and can be used within a range not significantly degrading the performance of the present invention. Examples of the viscosity modifier (E) are not limited and include, for example, BYK-420 and BYK-425 (produced by BYK Japan K.K.).

Examples of the solvent (F) include, for example, water, aromatic hydrocarbons such as toluene and xylene, aliphatic hydrocarbons such as hexane, octane, and decane, alicyclic hydrocarbons such as cyclohexane and methylcyclohexane, esters such as methyl acetate, ethyl acetate, propyl acetate, and butyl acetate, ketones such as acetone, methylethyl ketone, methylpropylketone, methylisobutyl ketone, and cyclohexanone, alcohols such as methanol, ethanol, n-propanol, isopropanol, n-butanol, 2-butanol, isobutanol, t-butanol, cyclohexanol, ethylene glycol, propylene glycol, and butane diol, ethers such as dipropyl ether, dibutyl ether and tetrahydrofuran, organic solvents each having two or more functional groups such as 2-methoxyethanol, 2-ethoxyethanol, 2-butoxyethanol, 2-methoxypropanol, 2-ethoxypropanol, and diacetone alcohol, and polar solvents such as dimethylformamide and dimethylsulfoxide. Among these, more preferably, water is used.

The auxiliary resin (G) is used as the resin component for, for example, a mill base. For purpose of, for example, improving the outer appearance of the coating (imparting the gloss or delustering) and reducing the tackiness, a water-soluble resin or a resin capable of being dispersed in water can be used when necessary together with the aqueous dispersion mixture. A resin may be used that can be dispersed using a surfactant. Examples of the resin capable of being dispersed in water include, for example, an acrylic resin, a polyepoxy resin, a polyester resin, a urethane resin, a melamine resin, and an alkyd resin that are ordinary ones. The form of the resin dispersion comprising these resins is not especially limited. A curing agent component may be comprised when necessary. The curing agent components are used that comprise, for example, carbodiimide, epoxy, triarylisocyanurate, multi-functional acrylate, oxazoline, melamine, isocyanate, or block isocyanate. These curing agent components may each be of a high molecular weight type or a low molecular weight type, and the molecular weight thereof is not limited.

In the present invention, the other additive component (H) may be comprised within a range not significantly degrading the performance thereof. For example, various types of stabilizers such as a UV absorber, an antioxidant, an anti-weathering stabilizer, and a heat resistant agent; and various types of additives such as electric conductivity imparting agent such as titanium oxide, carbon black, and ferrite, a leveling agent, an antifoam agent, a thickener, a preservative, a fungicide, a rust inhibitor, and wetting agent may be blended to be used.

The components (D), (E), (F), (G), and (H) may each be added to the obtained aqueous dispersion mixture or may be added in advance to any one of the aqueous dispersions.

From the viewpoint of the today's environmental problems, reduction of volatile organic compounds (VOCs) is required to paints. A low VOC paint and a low VOC primer can be adjusted by using the aqueous dispersion mixture of the present invention. The VOC amount in each of the paint composition and the primer composition of the present invention is not especially limited and is, preferably, equal to or smaller than 250 g/L, more preferably, equal to or smaller than 150 g/L, and, further preferably, equal to or smaller than 100 g/L.

In this specification, the VOC amount (g/L) refers to the value calculated in accordance with the equation below (based on EN ISO 11890-1 (2000), 8,3 Method 2).

$$VOC=(100-NV-m_w)\times D\times 10$$

(Where NV means the non-volatile amount (% by mass) in the paint, $m_w$ means the water amount in the paint, and D means the density (g/ml) of the paint.)

The aqueous dispersion mixture of the present invention has excellent adhesiveness for various types of base material, various types of paints, and, especially, for a base material comprising a polyolefin, and can achieve water resistance and humidity resistance. The aqueous dispersion mixture is therefore useful for various types of use. For example, the aqueous dispersion mixture can be used as it is as an aqueous adhesive and a primer composition, and can be used in an aqueous paint composition, an aqueous adhesive, and a primer composition together with other components.

The coated film of the aqueous dispersion mixture can be obtained using a production method for a coated film comprising a step of applying the aqueous dispersion mixture to a base material.

For example, for the aqueous paint composition, a coated film can be formed on a base material by applying the aqueous paint composition to the base material and heating the aqueous paint composition at a temperature of 40° C. to 160° C., preferably, 60° C. to 130° C., and, more preferably, 80° C. to 110° C., and for 1 minute to 1 hour and, preferably, 3 to 30 minutes.

For example, for the primer composition, a coated film of the primer composition is formed by drying and/or curing at a temperature of room temperature to 100° C. when necessary, thereafter another paint or the like is applied to the coated film, and the coated film and the paint are heated at a temperature of 40° C. to 160° C., preferably, 60° C. to 130° C., and, more preferably, 80° C. to 110° C., and for 1 minute to 1 hour and, preferably, 3 to 30 minutes, and a coated film of the paint can thereby be formed.

For example, for the aqueous adhesive, two base materials can be adhered to each other by applying the aqueous adhesive to the surface(s) of one or both of the base materials, conducting drying and curing at a temperature of room temperature to 100° C. when necessary, thereafter bonding the base materials to each other, and treating the base materials at a proper temperature.

Examples of the base material include generally prevailing base materials each comprising an olefin-based resin such as a polyolefin, a polyamide resin, an unsaturated polyester resin, a polybutyleneterephthalate resin, a polycarbonate resin, a vinyl chloride resin, a polyester resin, a polyurethane resin, an epoxy resin, paper, synthesized paper, a wood material, a woven cloth, a knitted cloth, an unwoven cloth, a metal component (including iron, aluminum, copper, nickel, silver, gold, platinum, various types of alloy, or the like), a wood material (including a pulp paper material and the like), or a stone material. Examples of the olefin-based resin include a high-pressure method polyethylene, a middle or low-pressure method polyethylene, polypropylene, poly-4-methyl-1-pentene, poly-1-butene, an ethylene/propylene copolymer, an ethylene/butene copolymer, and a propylene/butene copolymer and, preferably, the olefin-based resin comprising a polypropylene crystalline structure is used.

The shape of the base material is not especially limited such as a film, a sheet, a plate-like article, or the like. The base material may be a molded article obtained by a known molding method such as injection molding, compression molding, hollow molding, extrusion, or rotational molding. The base material may comprise a resin composition that comprises the above resin, an inorganic filler component, a pigment, and the like. Examples of the inorganic filler component and the pigment include plate-like fillers such as talc, mica, and montmorillonite; fiber-like fillers such as short fiber glass fiber, long fiber glass fiber, carbon fiber, aramid fiber, alumina fiber, boron fiber, and zonolite; needle-shaped (whisker) fillers such as potassium titanate, magnesium oxysulfate, silicon nitride, aluminum borate, basic magnesium sulfate, zinc oxide, wollastonite, calcium carbonate, and silicon carbide; particle-like fillers such as precipitated calcium carbonate, heavy calcium carbonate, and magnesium carbonate; balloon-like fillers like glass balloons; and inorganic fillers and pigments such as Chinese white, titanium white, and magnesium sulfate.

When a base material is bonded, excellent adhesiveness is achieved when the aqueous adhesive comprises the material same as that of the base material or when the aqueous adhesive comprises the material different from that of the base material. Especially, the aqueous adhesive is suitable for laminating layers of a polyurethane resin film and a polyolefin resin film on each other, laminating layers of a polyurethane resin film and a polyester resin film on each other, and laminating layers of a polyurethane resin film and a metal on each other, Examples of the paint include a colored base paint and a clear paint. These may be aqueous or may be based on an organic solvent, and may comprise various types of resin such as an olefin-based polymer, and various types of pigment.

The method of applying the aqueous dispersion mixture to a base material is not especially limited and a known method can be used. Examples thereof include, for example, an air spray method, an air-less spray method, gravure roll coating, reverse roll coating, wire bar coating, lip coating, air knife coating, curtain flow coating, spray coating, immersion coating, and a brushing coating method.

Drying, curing, and heating can be conducted using, for example, a method and an apparatus that are traditionally used such as, for example, a nichrome wire, an infrared ray, and a high frequency.

The thickness of the formed coated film is properly selected based on the material and the shape of the base material and the composition of the used paint, and is usually 0.1 µm to 500 µm, preferably, 1 µm to 300 µm, and, more preferably, 3 µm to 200 µm. The thickness of the coated film is the thickness of the coated film after the drying, that is, an applied and dried article.

The coated film, the layered article, and the coated item that each use the aqueous dispersion mixture of the present invention have excellent water resistance and excellent humidity resistance, are therefore usable for various types of industrial part such as those for automobiles, home appliances, and construction materials, and have practically sufficient performance as parts/materials whose thicknesses are reduced, whose functions are enhanced, and whose sizes are increased. For example, the coated film, the layered article, and the coated item can be used as molding materials for various types of industrial parts such as automobile parts such as a bumper, an instrumental panel, a trim, and a garnish, home appliance parts such as a TV case, a washing machine tank, a refrigerator part, an air conditioner part, and a cleaner part, water close parts such as a water closet seat, a water closet seat lid, and a water tank, and the parts in and around a bathroom such as a bathtub, a bath room wall, a ceiling, and a drainage van. Especially, the coated film, the layered article, and the coated item are suitable for a automobile bumper. The coated item comprises an applied and dried article of the aqueous dispersion mixture. The applied and dried article refers to a coated film after being dried that is obtained by applying the aqueous dispersion mixture to an article to be coated, and thereafter drying the applied article. The applied and dried article can have the thickness of the film thickness after the drying.

EXAMPLES

The present invention will be described in more detail with reference to Examples while the present invention is not limited to Examples below.

(1) Content of Modified Functional Group Unit

The content of the maleic acid anhydride unit in the polyolefin (a) was calculated from an absorption around 1,780 $cm^{-1}$ obtained by measuring the infrared absorption spectrum of a film obtained by heat-pressing a sample to form the film having a thickness of 100 µm.

For those that were modified spices other than maleic acid anhydride and that were not capable of being measured using the infrared absorption spectrum, the content was determined using $^1$H-NMR.

(2) Melting Point and Crystal Melting Heat Amount

The melting point and the crystal melting heat amount of the polyolefin were measured using a differential scanning calorimeter (EXSTAR 6000 manufactured by Seiko Instruments, Inc. (SI)) under the following conditions.
(i) The temperature of a specimen of about 5 mg was increased from room temperature to 200° C. at a temperature increase rate of 30° C./min and, after the completion of the temperature increase, the temperature was maintained for 5 minutes.
(ii) The temperature was decreased from 200° C. to −100° C. at a temperature decrease rate of 10° C./min and, after the completion of the temperature decrease, the temperature was maintained for 5 minutes.
(iii) The temperature was increased from −100° C. to 200° C. at a temperature increase rate of 10° C./min. The temperature at which the melting peak of the crystal was observed was determined to be the melting point. Presence or absence of the melting peak was checked whose peak area, that is, the crystal melting heat amount was 1 J/g or larger, or 3 J/g or larger.

(3) Weight Average Molecular Weight Mw

The measurement was conducted using gel permeation chromatograph (GPC) method under the following conditions.
Apparatus: HLC-8121 GPC/HT manufactured by Tosoh Corporation
Column: Four of TSKgel GMHHR-H(S)HT manufactured by Tosoh Corporation
Temperature: 145° C.
Solvent: o-dichlorobenzene
Eluting Solvent Flow Rate: 1.0 ml/min
Specimen Concentration: 1 mg/ml
Measurement Injection Amount: 300 µl
Molecular Weight Standard: Standard polystyrene
Detector: Differential refraction For calculating the weight average molecular weight (Mw) and the number average molecular weight (Mn) of the polyolefin, a commercially available monodispersed polystyrene standard specimen was measured as a standard specimen and the calibration curve was produced from the retention time period and the molecular weight of the standard specimen to perform the calculation.

(4) Particle Diameter

The average particle diameter of the dispersoid was measured using a rich system particle diameter analyzer FPAR-1000 manufactured by Otsuka Electronics, Co., Ltd., that observed the scattered light from the particles using dynamic scattering.

(5) Evaluation of Stability Over Time of Aqueous Dispersion Mixture (Examples 1 to 7)

The aqueous dispersion mixture was put in a 300-cc glass bottle with an inner lid and was left untouched for 10 days in an atmosphere at 40° C.
[Variation of Viscosity]
In the viscosity measurement using a Ford cup #4, the case where the difference between the initial value and the value obtained after 10 days was equal to or higher than 30% was determined to be NG and the case where the difference therebetween was lower than 30% was determined to be OK.
[Variation of pH]
As to the measured value obtained using a pH meter (a handy type pH meter, SK-620 PH manufactured by Satoh Keiryouki Mfg., Co., Ltd.), the case where the difference between the initial value and the value obtained after 10 days was equal to or higher than 5% was determined to be NG and the case where the difference therebetween was lower than 5% was determined to be OK.
[Aggregated Substance]
The case where the sample after 10 days had any aggregated substance that was observed by visual observation was determined to be NG and the case where no such aggregated substance was observed was determined to be OK.

(6) Peeling Strength (Examples 8 to 11 and Comparative Examples 9 to 13)

A coated article to be tested was cut out to have a width of 10 mm and the peeling strength of the coated film was measured at a pulling rate of 50 mm/min and at a pulling angle of 180 degrees using a tensile testing machine (an autograph manufactured by Shimadzu Corp.).

The peeling strength after the water resistance test was measured in accordance with the following method. The test piece produced in each of Examples 8 to 11 and Comparative Examples 9 to 13 was immersed for 10 days in ion-exchanged water at 40° C., and thereafter was taken out from the ion-exchanged water, and the moisture thereof was wiped out to conduct the measurement as to the peeling strength within 30 minutes under the conditions as above.

(7) Outer Appearance Evaluation (Examples 8 to 11 and Comparative Examples 9 to 13)

The outer appearance evaluation after the water resistance test was conducted in accordance with the following method. The test piece produced in each of Examples 8 to 11 and Comparative Examples 9 to 13 was immersed for 10 days in ion-exchanged water at 40° C., and thereafter was taken out from the ion-exchanged water, and the moisture thereof was wiped out for the surface of the test piece to be observed by visual observation. The case where no blister was generated was determined to be OK and the case where any blister was generated was determined to be NG.

(8) Water Resistance Test (Examples 12 to 25 and Comparative Examples 14 to 25)

A sample formed by conducting predetermined painting and end face treatment for the test piece was immersed for 10 days in warm water at 40° C., and the following evaluations were thereafter performed.
[Gloss]
The moisture on the sample was wiped out and the test plate was dried under the conditions of 60° C.×3 hours. The gloss at each of 20° and 60° was thereafter measured by a gloss meter (Micro TRI manufacture by BYK Gardner GmbH) and the rate relative to the initial value was determined. For the gloss at 20°, the case where the gloss maintaining rate was equal to or higher than 80% was determined to be OK and the case where the rate was lower than 80% was determined to be NG. For the gloss at 600, the case where the gloss maintaining rate was equal to or higher than 90% was determined to be OK and the case where the rate was lower than 90% was determined to be NG.
[Adhesiveness]
Samples before and after immersion in the warm water at 40° C. for 10 days (before and after the water resistance test) were each evaluated using a cross-cut testing method (the width was 2 mm, a tape form Nichiban Co., Ltd., was used, and peeling of the tape was conducted for three times) (the initial adhesiveness). The case where the degree of the adhesiveness was 100/100 was determined to be OK and the case where the degree of the adhesiveness was lower than this was determined to be NG. The moisture of the sample after the immersion for 10 days in the warm water at 40° C. was wiped out and the test plate was dried under the conditions of 60° C.×three hours and was evaluated using the cross-cut testing method.
[Blister]
Immediately after the wiping out of the moisture of the sample, the surface condition of the sample was observed by visual observation. The case where the blister was observed on the overall sample was determined to be NG and the case other than this was determined to be OK.
[Preparation of Aqueous Dispersion (A-1)]
100 g of a non-chlorine modified crystalline polyolefin (a-1) [formed by modifying 100 parts by mass of an ethylene/propylene copolymer (ethylene:propylene=15% by mol: 85% by mol, Mw=55,000, and the melting point=70° C.] by 10 parts by mass of maleic acid anhydride and 20 parts by mass of dodecylmethacrylate to have a melting point of 71° C., Mw of about 63,000, and the content of the maleic acid anhydride unit is 5.1 parts by mass relative to 100 parts by mass of the olefin unit of the crystalline polyolefin) was put in a separable flask to be melted in an oil bath whose temperature was maintained at 100° C. 20 g of 2-butanol and 5 g of dimethylaminoethanol were thereafter added to the content to be stirred to be mixed with each other. After the melting and mixing, ion-exchanged water at 80° C. was gradually added to the content being strongly stirred. When 200 g of the ion-exchanged water was added, the content was taken out and the volatile components other than the ion-exchanged water were removed using an evaporator to obtain the aqueous dispersion (A-1) of the non-chlorine modified crystalline polyolefin. The non-volatile content was about 30% and the melting point of (a-1) by the DSC measurement was 69° C. The average particle diameter of the dispersoid in (A-1) was 0.1 µm.

An attempt was made using the steps same as above to obtain the aqueous dispersion of the crystalline polyolefin without using any modified functional group and any aimed aqueous dispersion was not obtained because the dispersibility was poor.

[Preparation of Aqueous Dispersion (B) and Aqueous Dispersion (C)]

Aqueous Dispersion (B-1)

Bayhydrol® UH 2869 was used that was a polyurethane dispersion produced by Covestro (used to be Bayer Material Science AG (51368 Leverkusen)). The non-volatile content thereof is about 50% by mass and this comprises a polyurethane resin that has a structural unit originated from an aliphatic and an alicyclic isocyanate as an isocyanate component and a structural unit originated from a polyester polyol having a regular polyester structure based on a linear dicarboxylic acid and a linear diol.

The glass transition temperature of the polyurethane resin by DSC measurement is −50° C., the melting point thereof was about 48° C., and the crystal melting heat amount thereof is 39 J/g. The viscosity thereof is 250 mPa·s/25° C., pH thereof is 7.0, and the average particle diameter thereof was 235 nm.

Aqueous Dispersion (B-2)

Dispercoll® U 8755 was used that was a polyurethane dispersion produced by Covestro (used to be Bayer Material Science AG (51368 Leverkusen)). The non-volatile content thereof was about 45% by mass and this comprises a polyurethane resin that has a structural unit originated from an aliphatic and an alicyclic isocyanate as an isocyanate component and a structural unit originated from a polyester polyol having a regular polyester structure based on a linear dicarboxylic acid and a linear diol.

The glass transition temperature of the polyurethane resin by DSC measurement was −51° C., the melting point thereof is about 50° C., and the crystal melting heat amount thereof is 53 J/g. The viscosity thereof is 300 mPa·s/25° C., pH thereof is 7.5, and the average particle diameter thereof is 230 nm.

Aqueous Dispersion (C-1)

Baybond® PU 407 was used that was a polyurethane dispersion produced by Covestro (used to be Bayer Material Science AG (51368 Leverkusen)). The non-volatile content thereof is about 40% by mass and this comprises a polyurethane resin that has a structural unit originated from an aliphatic and an alicyclic isocyanate as an isocyanate component and a structural unit originated from a polyester polyol having a non-regular polyester structure.

The glass transition temperature of the polyurethane resin by DSC measurement is −50° C. and the crystal melting heat amount thereof is not clearly presented and is 0 J/g. The viscosity thereof is 250 mPa·s/25° C., pH thereof is 7.0, and the average particle diameter thereof is 210 nm.

Aqueous Dispersion (C-2)

Impranil® DLS was used that was a polyurethane dispersion produced by Covestro (used to be Bayer Material Science AG (51368 Leverkusen)). The non-volatile content thereof is about 45% by mass and this comprises a polyurethane resin that has a structural unit originated from an aliphatic and an alicyclic isocyanate as an isocyanate component and a structural unit originated from a polyester polyol having a non-regular polyester structure.

The glass transition temperature of the polyurethane resin by DSC measurement is −51° C. and the crystal melting heat amount thereof is not clearly presented and is 0 J/g. The viscosity thereof is 220 mPa·s/25° C., pH thereof is 7.5, and the average particle diameter thereof is 220 nm.

Aqueous Dispersion (C-3)

Bayhydrol® UH 650 was used that was a polyurethane dispersion produced by Covestro (used to be Bayer Material Science AG (51368 Leverkusen)). The non-volatile content thereof is about 50% by mass and this comprises a polyurethane resin that has a structural unit originated from an aliphatic and an alicyclic isocyanate as an isocyanate component and a structural unit originated from a polyester polyol having a non-regular polyester structure.

The glass transition temperature of the dispersion polymer by DSC measurement is −43° C. and the crystal melting heat amount thereof is not clearly presented and is 0 J/g. The viscosity thereof is 700 mPa·s/25° C., pH thereof is 7.0, and the average particle diameter thereof is 210 nm.

The paint for evaluation of the monocoat and the recoat was prepared as follows.

Primer Paint

1, Mill Base Blend

A Mill base blend was first prepared based on Table 1.

TABLE 1

| Mill Base Blend | Composition, Function | Non-Volatile Content % | Producer | Blending % by Mass |
|---|---|---|---|---|
| Vilonal MD-1200 | Aqueous polyester resin | 34.0 | Toyobo Co., Ltd. | 9.0 |
| Disper BYK 190 | Dispersant | 40.0 | BYK | 4.1 |
| EnviroGem AD01 | Antifoam agent | | Air Products | 4.1 |
| Deionized Water | | | | 22.3 |
| 10% Diethanolamine | Amine | | | 2.0 |
| Surfinol 104E | Wetting agent | 50.0 | Air Products | 3.3 |
| Printex A | Carbon black | | Ebonic | 5.5 |
| Tronox R-KB-2 | Titanium oxide | | Tronox | 35.8 |
| Bariace B35 | Barium sulfate | | Sakai Chemical | 9.4 |
| Talkum IT extra | Talc | | Mondo Minerals | 2.8 |
| ASP 170 | Kaolin | | BASF | 1.7 |
| Total | | | | 100.0 |

The blending mass of each of the aqueous polyester resin, the dispersant, and the wetting agent is presented as a total of the dispersion medium (the solvent) and the non-volatile content. The same will be applied to Tables 2 to 4 below.

2. Primer Paint

Based on Table 2, a primer paint was prepared using the mill base blend prepared as above. Of this paint composition, NV was NV=about 45% by mass, $m_v$ was $m_v$=about 49% by mass, D was D=about 1.55 g/mL, and the VOC amount was about 93 g/L.

TABLE 2

| Primer Blend | Composition, Function | Producer | Blending % by Mass |
|---|---|---|---|
| Aqueous Dispersion Mixture Produced in Example 1 | | | 53.7 |
| Mill base | (The above) | | 36.1 |
| 2-ethylhexanol | Solvent | | 2.9 |

TABLE 2-continued

| Primer Blend | Composition, Function | Producer | Blending % by Mass |
|---|---|---|---|
| Proglide DMM | Solvent | Dow Chemical | 0.7 |
| Primal ASE 60 | Thickener | Rohm & Haas | 0.6 |
| Deionized Water | | | 6.0 |
| Total | | | 100.0 |

3. Base Coat Paint

Based on Table 3 below, a base coat paint was prepared.

TABLE 3

| Base Coat Blend | Function | Non-Volatile Content % | Producer | Blending % by Mass |
|---|---|---|---|---|
| Bayhydrol A2457 | Aqueous acrylic resin | 40 | Cov* | 22.51 |
| Bayhydrol UH 2621 | Aqueous urethane resin | 40 | Cov* | 9.38 |
| Cymel 327 | Melamine resin | 90 | CYTEC | 2.5 |
| 10% Diethanolamine | Amine | | | 5.66 |
| Deionized Water | | | | 28.5 |
| Butyl Glycol | Auxiliary agent | | | 7.35 |
| BYK 347 | Wetting agent | | BYK | 0.45 |
| Viscalex HV 30 | Thickener | 6 | Allied Colloids | 17.5 |
| EMR D5660 50% in PM | Aluminum | 50 | TOYO | 5.7 |
| Disperbyk 192 | Wetting agent | | BYK | 0.15 |
| Disparlon AQ 320 | Wetting agent | | Kusumoto | 0.3 |
| Total | | 20 | | 100 |

*Cov: Covestro

4. Clear Coat Paint

Based on Table 4 below, a clear coat paint was prepared.

TABLE 4

| Clear Coat Blend | Function | Non-Volatile Content % | Producer | Blending % by Mass |
|---|---|---|---|---|
| Desnophen A 870 BA | Hydroxyl group-containing acrylic resin | 70 | Cov* | 52.8 |
| BYK 331 | Leveling agent | 10 | BYK | 0.6 |
| Modaflow | Wetting agent | 1 | Cytec | 0.5 |
| Butyl Glycol | Solvent | | | 13.1 |
| Methoxypropyl-acetate | Solvent | | | 13.1 |
| Desmodur N 3390 EA | Isocyanate | 90 | Cov* | 19.9 |
| Total | | 55 | | 100 |

*Cov: Covestro

Examples 1 to 7 and Comparative Examples 1 to 8

The aqueous dispersions obtained as above were mixed with each other at room temperature such that the non-volatile contents of the aqueous dispersions were equal to the % by mass listed in Table 5 to obtain aqueous dispersion mixtures.

TABLE 5

| | Non-Volatile Content of Aqueous Dispersion in Aqueous Dispersion Mixture [% by mass] | | | | | |
|---|---|---|---|---|---|---|
| | A-1 | B-1 | B-2 | C-1 | C-2 | C-3 |
| Example 1 | 47.4 | 26.3 | — | 26.3 | — | — |
| Example 2 | 47.4 | 26.3 | — | — | 26.3 | — |
| Example 3 | 47.4 | 26.3 | — | — | — | 26.3 |
| Example 4 | 47.4 | — | 26.3 | 26.3 | — | — |
| Example 5 | 47.4 | 42.1 | — | 10.5 | — | — |
| Example 6 | 42.1 | 28.9 | — | 28.9 | — | — |
| Example 7 | 57.9 | 21.1 | — | 21.1 | — | — |
| Comparative Example 1 | 47.4 | 52.6 | — | — | — | — |
| Comparative Example 2 | 47.4 | — | 52.6 | — | — | — |
| Comparative Example 3 | 47.4 | — | — | 52.6 | — | — |
| Comparative Example 4 | 47.4 | — | — | — | 52.6 | — |
| Comparative Example 5 | 47.4 | — | — | — | — | 52.6 |
| Comparative Example 6 | 47.4 | 10.5 | — | 42.1 | — | — |
| Comparative Example 7 | 21.1 | 39.5 | — | 39.5 | — | — |
| Comparative Example 8 | 73.7 | 13.2 | — | 13.2 | — | — |

For the aqueous dispersion mixtures obtained in Examples 1 to 7, the stability over time of the aqueous dispersion mixtures was evaluated (variation of the viscosity, variation of pH, and the aggregated substance) in accordance with the measurement methods and the evaluation methods as above. Excellent results thereof were presented and the following evaluation was therefore performed.

Good results were also presented for Comparative Examples 1 to 8 and the following evaluation was therefore similarly performed.

Example 8

The aqueous dispersion mixture prepared in Example 1 was applied to a defatted polypropylene base material (JNB-117 produced by Topura Industries Co., Ltd., 70 mm×150 mm×3 mm, a product with non-treated surface) using a wire bar to have a dried film thickness of about 10 μm to be pre-heated at 50° C. for 5 minutes, and acrylic urethane paint "Polynal No. 800" (Ohashi Chemical Co., Ltd.) was applied thereto by spraying to have a dried film thickness of about 100 μm to be heated to be dried at 80° C. for 30 minutes to produce a painted article to be tested.

Examples 9 to 11 and Comparative Examples 9 to 13

In Example 8, painted articles to be tested were produced by operating in the same manner as that of Example 8 except that the aqueous dispersion mixtures produced in Examples 2 to 4 and Comparative Examples 1 to 5 were used instead of the aqueous dispersion mixtures of Example 1.

For the painted articles obtained in Examples 8 to 11 and Comparative Examples 9 to 13, the peeling strengths before and that after the water resistance test were measured in accordance with the measurement method and the evaluation method as above to evaluate the outer appearance after the water resistance test. The results are shown in Table 6 below.

TABLE 6

| Aqueous Dispersion Mixture | | Peeling Strength [N/cm] | | |
|---|---|---|---|---|
| | | Before Water Resistance Test | After Water Resistance Test | Blister |
| Example 8 | Example 1 | 5.2 | 6.0 | OK |
| Example 9 | Example 2 | 4.9 | 5.5 | OK |
| Example 10 | Example 3 | 4.3 | 4.5 | OK |
| Example 11 | Example 4 | 4.5 | 5.5 | OK |
| Comparative Example 9 | Comparative Example 1 | 4.9 | 4.7 | NG |
| Comparative Example 10 | Comparative Example 2 | 5.0 | 5.4 | NG |

TABLE 6-continued

| Aqueous Dispersion Mixture | | Peeling Strength [N/cm] | | |
|---|---|---|---|---|
| | | Before Water Resistance Test | After Water Resistance Test | Blister |
| Comparative Example 11 | Comparative Example 3 | 8.7 | 9.0 | NG |
| Comparative Example 12 | Comparative Example 4 | 4.6 | 5.1 | NG |
| Comparative Example 13 | Comparative Example 5 | 3.7 | 5.8 | NG |

As shown in Table 6, it can be seen that the aqueous dispersion mixture of the present invention had high adhesiveness for the base material and the coated film and had excellent water resistance.

Example 12

The primer paints in Table 2 prepared using the aqueous dispersion mixture of Example 1 was applied to the polypropylene base material used in Example 8 by spraying to have a dried film thickness of about 10 μm. After heating at 80° C. for 5 minutes, the base coat paint was applied thereon by spraying to have a dried film thickness of about 5 μm to be heated at 80° C. for 5 minutes. The clear coat paint was applied thereto by spraying to have a dried film thickness of 30 to 40 μm to be heated and dried at 80° C. for 30 minutes to obtain a mono-coat test painted plate.

Examples 13 to 18 and Comparative Examples 14 to 19

In Example 12, painted articles to be tested were produced by operating in the same manner as that of Example 12 except that the aqueous dispersion mixtures produced in Examples 2 to 7 and Comparative Examples 1 to 3 and 6 to 8 were used as the aqueous dispersion mixtures. For the obtained mono-coat test painted plates, the evaluation method was performed using the water resistance test. The results are shown in Table 7.

TABLE 7

| Evaluation of Water Resistance of Mono-Coat Test Painted Plate | Aqueous Dispersion Mixture | Gloss at 20° | Gloss at 60° | Adhesiveness | | |
|---|---|---|---|---|---|---|
| | | | | Before Water Resistance Test (Initial Adhesiveness) | After Water Resistance Test | Blister |
| Example 12 | Example 1 | OK | OK | OK | OK | OK |
| Example 13 | Example 2 | OK | OK | OK | OK | OK |
| Example 14 | Example 3 | OK | OK | OK | OK | OK |
| Example 15 | Example 4 | OK | OK | OK | OK | OK |
| Example 16 | Example 5 | OK | OK | OK | OK | OK |
| Example 17 | Example 6 | OK | OK | OK | OK | OK |
| Example 18 | Example 7 | OK | OK | OK | OK | OK |
| Comparative Example 14 | Comparative Example 1 | OK | OK | OK | OK | NG |
| Comparative Example 15 | Comparative Example 2 | OK | OK | OK | OK | NG |
| Comparative Example 16 | Comparative Example 3 | OK | OK | OK | NG | NG |
| Comparative Example 17 | Comparative Example 6 | OK | OK | OK | OK | NG |
| Comparative Example 18 | Comparative Example 7 | OK | OK | NG | NG | NG |
| Comparative Example 19 | Comparative Example 8 | OK | OK | OK | OK | NG |

Example 19

The mono-coat test painted plate produced in Example 12 was cured at room temperature for 3 days and its surface was defatted. Three layers of the predetermined primer paint, the base coat paint, and the cleat coat paint were applied to each other on the mono-coat test painted plate in accordance with the procedure same as that of Example 12 to produce a coat test painted plate.

Examples 20 to 25 and Comparative Examples 20 to 25

In Example 19, corresponding recoat test painted plates were produced by operating in the same manner as that of Example 19 except that the mono-coat test painted plates produced in Examples 13 to 18 and Comparative Examples 14 to 19 were used instead of the mono-coat test painted plate produced in Example 12. For the obtained mono-coat test painted plates, the evaluation was performed using the above method.

The results are show in Table 8.

TABLE 8

| Evaluation of Water Resistance of Recoat Test Painted Plate | Aqueous Dispersion Mixture | Gloss at 20° | Gloss at 60° | Adhesiveness | | |
|---|---|---|---|---|---|---|
| | | | | Before Water Resistance Test (Initial Adhesiveness) | After Water Resistance Test | Blister |
| Example 19 | Example 1 | OK | OK | OK | OK | OK |
| Example 20 | Example 2 | OK | OK | OK | OK | OK |
| Example 21 | Example 3 | OK | OK | OK | OK | OK |
| Example 22 | Example 4 | OK | OK | OK | OK | OK |
| Example 23 | Example 5 | OK | OK | OK | OK | OK |
| Example 24 | Example 6 | OK | OK | OK | OK | OK |
| Example 25 | Example 7 | OK | OK | OK | OK | OK |
| Comparative Example 20 | Comparative Example 1 | OK | OK | OK | OK | OK |
| Comparative Example 21 | Comparative Example 2 | OK | OK | OK | OK | OK |
| Comparative Example 22 | Comparative Example 3 | OK | OK | NG | NG | NG |
| Comparative Example 23 | Comparative Example 6 | NG | NG | OK | OK | OK |
| Comparative Example 24 | Comparative Example 7 | NG | NG | NG | NG | NG |
| Comparative Example 25 | Comparative Example 8 | NG | NG | NG | NG | NG |

As shown in Table 7, it can be seen that the aqueous dispersion mixture of the present invention had high adhesiveness for the base material and the coated film, and had excellent water resistance. As shown in Table 8, it can be seen that the aqueous dispersion mixture of the present invention had an excellent recoat property.

INDUSTRIAL APPLICABILITY

The aqueous dispersion mixture of the present invention not only presents strong adhesiveness for a base material comprising a polyolefin but also presents high adhesiveness for a base material comprising a polymer other than the polyolefin and for coated films comprising various types of paint such as a clear coat and a base coat each comprising a material other than the polyolefin. The aqueous dispersion mixture of the present invention achieves high humidity resistance and high water resistance. The aqueous dispersion mixture of the present invention is a substance that takes the environment into consideration by using a polyolefin not modified by chlorine. The aqueous dispersion mixture of the present invention is therefore advantageously usable for a primer, a paint composition, an aqueous adhesive, and the like.

The invention claimed is:

1. An aqueous dispersion mixture comprising;
an aqueous dispersion (A) that comprises a crystalline polyolefin (a) as a dispersoid thereof;
an aqueous dispersion (B) that comprises a crystalline polyurethane (b) as a dispersoid thereof; and
an aqueous dispersion (C) that comprises a non-crystalline polyurethane (c) as a dispersoid thereof, wherein
the crystalline polyolefin (a) is a non-chlorine modified polyolefin, wherein
the crystalline polyurethane (b) has a crystal melting heat amount equal to or larger than 3 J/g measured by differential scanning calorimetry, wherein
the non-crystalline polyurethane (c) has a crystal melting heat amount smaller than 3 J/g measured by differential scanning calorimetry, and wherein
the aqueous dispersion (B) comprises a non-volatile content of 30 parts by mass to 100 parts by mass and the aqueous dispersion (C) comprises a non-volatile content of 20 parts by mass to 80 parts by mass, relative to a non-volatile content of 100 parts by mass of the aqueous dispersion (A).

2. The aqueous dispersion mixture according to claim 1, wherein
the non-chlorine modified crystalline polyolefin (a) comprises a modified functional group unit of 0.1 to 40 parts by mass relative to 100 parts by mass of an olefin unit.

3. The aqueous dispersion mixture according to claim 1, wherein
melting points of the non-chlorine modified crystalline polyolefin (a) and the crystalline polyurethane (b) measured by differential scanning calorimetry (DSC) are each equal to or lower than 100° C.

4. The aqueous dispersion mixture according to claim 1, wherein
a weight average molecular weight Mw of the non-chlorine modified crystalline polyolefin (a) is 20,000 to 200,000.

5. The aqueous dispersion mixture according to claim 1, wherein
the dispersoids of the aqueous dispersions (A), (B), and (C) each have an average particle diameter equal to or smaller than 1.0 μm.

6. The aqueous dispersion mixture according to claim 1, wherein
the dispersoid of the aqueous dispersion (A) is a self-emulsion of a non-chlorine modified crystalline polyolefin.

7. The aqueous dispersion mixture according to claim 1, wherein
glass transition points of the crystalline polyurethane (b) and the non-crystalline polyurethane (c) measured by differential scanning calorimetry (DSC) are each equal to or lower than −20° C.

8. The aqueous dispersion mixture according to claim 1, wherein
the crystalline polyurethane (b) and the non-crystalline polyurethane (c) are each a polyurethane that comprises, as a constituting component of the polyurethane, one or more structural unit(s) selected from the group consisting of an aliphatic diisocyanate, an alicyclic diisocyanate, and an aromatic diisocyanate, and one or more structural unit(s) selected from the group consisting of a polyester polyol, a polycarbonate polyol, and a polytetramethyleneether glycol.

9. The aqueous dispersion mixture according to claim 1, wherein
the crystalline polyurethane (b) comprises a carboxyl group and/or a sulfonyl group.

10. A method for producing a coated film, the method comprising a step of applying the aqueous dispersion mixture according to claim 1, to a base material.

11. The method for producing a coated film, according to claim 10, wherein
the base material comprises an olefin-based resin.

12. A painted article comprising an applied and dried item of the aqueous dispersion mixture according to claim 1.

13. An aqueous paint composition comprising the aqueous dispersion mixture according to claim 1.

14. The aqueous paint composition according to claim 13, comprising, relative to 100 parts by mass of a non-volatile content of the aqueous dispersion (A):

30 to 100 parts by mass of a non-volatile content of the aqueous dispersion (B);
20 to 80 parts by mass of a non-volatile content of the aqueous dispersion (C);
1 to 200 parts by mass of a pigment (D);
0 to 50 parts by mass of a viscosity modifier (E);
0 to 1,000 parts by mass of a solvent (F);
0 to 50 parts by mass of an auxiliary resin (G); and
0 to 100 parts by mass of other additives (H).

15. The aqueous paint composition according to claim 13, wherein
an amount of a volatile organic compound (VOC) is equal to or smaller than 250 g/L.

16. An aqueous primer composition comprising the aqueous dispersion mixture according to claim 1.

17. The aqueous primer composition according to claim 16, wherein
an amount of a volatile organic compound is equal to or smaller than 250 g/L.

18. An aqueous adhesive comprising the aqueous dispersion mixture according to claim 1.

* * * * *